(12) United States Patent
Yue et al.

(10) Patent No.: US 10,270,625 B2
(45) Date of Patent: Apr. 23, 2019

(54) HARDWARE VIRTUALIZATION FOR MEAN AND VARIANCE ESTIMATIONS OF QAM SYMBOLS

(71) Applicant: Futurewei Technologies, Inc., Plano, TX (US)

(72) Inventors: Guosen Yue, Edison, NJ (US); Xiao-Feng Qi, Westfield, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/392,831

(22) Filed: Dec. 28, 2016

(65) Prior Publication Data
US 2018/0176041 A1 Jun. 21, 2018

Related U.S. Application Data

(60) Provisional application No. 62/436,202, filed on Dec. 19, 2016.

(51) Int. Cl.
*H04L 25/02* (2006.01)
*H04L 27/34* (2006.01)
(Continued)

(52) U.S. Cl.
CPC ............ *H04L 25/025* (2013.01); *H04L 1/004* (2013.01); *H04L 25/067* (2013.01); *H04L 25/08* (2013.01);
(Continued)

(58) Field of Classification Search
CPC ... H04L 1/0048; H04L 1/0054; H04L 1/0631; H04L 25/067; H04L 27/2647; H04L 25/025
(Continued)

(56) References Cited

U.S. PATENT DOCUMENTS 8,355,313 B2  1/2013 Walton et al.
8,885,628 B2  11/2014 Palanki et al.
(Continued)

FOREIGN PATENT DOCUMENTS

CN    101883063 A    11/2010
CN    104660531 A    5/2015
(Continued)

OTHER PUBLICATIONS

U.S. Appl. No. 14/994,538, filed Jan. 13, 2016 by Yue et al.
(Continued)

*Primary Examiner* — Leila Malek
(74) *Attorney, Agent, or Firm* — Vierra Magen Marcus LLP

(57) ABSTRACT

Receivers including estimation unit (EU) circuits and related processing techniques for wireless systems are provided. Efficient expressions for quadrature amplitude modulation (QAM) symbol mean and variance calculations are utilized with efficient expressions and implementations that are adaptive to different orders of QAM formats. An EU circuit includes a mean estimation unit (MEU) circuit and/or second moment estimation unit (SEU) circuit. Each estimation unit circuit is configured to receive a variable QAM normalization factor so that the circuit can be adapted to different QAM orders. Each MEU or SEU circuit can be configured for sequential and/or parallel processing. A pool including multiple MEU circuits and/or a pool including multiple SEU circuits is provided in one embodiment, with a control unit for configuring and reconfiguring the pools of circuits for mean and variance estimation for data streams of QAM symbols.

23 Claims, 21 Drawing Sheets

(51) Int. Cl.
*H04L 25/08* (2006.01)
*H04L 1/00* (2006.01)
*H04L 25/06* (2006.01)
*H04L 27/38* (2006.01)
*H04B 7/0413* (2017.01)
*H04L 25/03* (2006.01)

(52) U.S. Cl.
CPC .............. *H04L 27/34* (2013.01); *H04L 27/38* (2013.01); *H04B 7/0413* (2013.01); *H04L 2025/0342* (2013.01); *H04L 2025/03426* (2013.01)

(58) Field of Classification Search
USPC ........................................................ 375/261
See application file for complete search history.

(56) References Cited

U.S. PATENT DOCUMENTS

| | | | |
|---|---|---|---|
| 8,917,654 | B2 | 12/2014 | Palanki |
| 9,036,538 | B2 | 5/2015 | Palanki |
| 9,485,697 | B1 | 11/2016 | Wang et al. |
| 2007/0162819 | A1* | 7/2007 | Kawamoto .......... H04B 7/0854 714/758 |
| 2008/0144733 | A1 | 6/2008 | ElGamal et al. |
| 2013/0279559 | A1 | 10/2013 | Samuel Bebawy et al. |
| 2013/0301757 | A1 | 11/2013 | Dao et al. |
| 2014/0146758 | A1* | 5/2014 | Lovell .................. H04L 5/0046 370/329 |
| 2015/0365203 | A1 | 12/2015 | Suh et al. |
| 2016/0105272 | A1 | 4/2016 | Griffiths et al. |

FOREIGN PATENT DOCUMENTS

| | | |
|---|---|---|
| EP | 1424781 A1 | 6/2004 |
| WO | WO2007/024913 A1 | 3/2007 |

OTHER PUBLICATIONS

U.S. Appl. No. 15/197,030, filed Jun. 29, 2016 by Yue et al.
U.S. Appl. No. 15/151,809, filed May 11, 2016 by Nammi et al.
U.S. Appl. No. 15/069,700, filed Mar. 14, 2016 by Wang et al.
U.S. Appl. No. 15/065,072, filed Mar. 9, 2016 by Yue et al.
Yue et al., "Iterative MMSE-SIC Receiver with Low-Complexity Soft Symbol and Residual Interference Estimations", 2013 Asilomar Conference on Signals, Systems and Computers, IEEE, Nov. 2013, 5 pages.
PCT/CN2017/117241, ISR, dated Mar. 16, 2018.

* cited by examiner

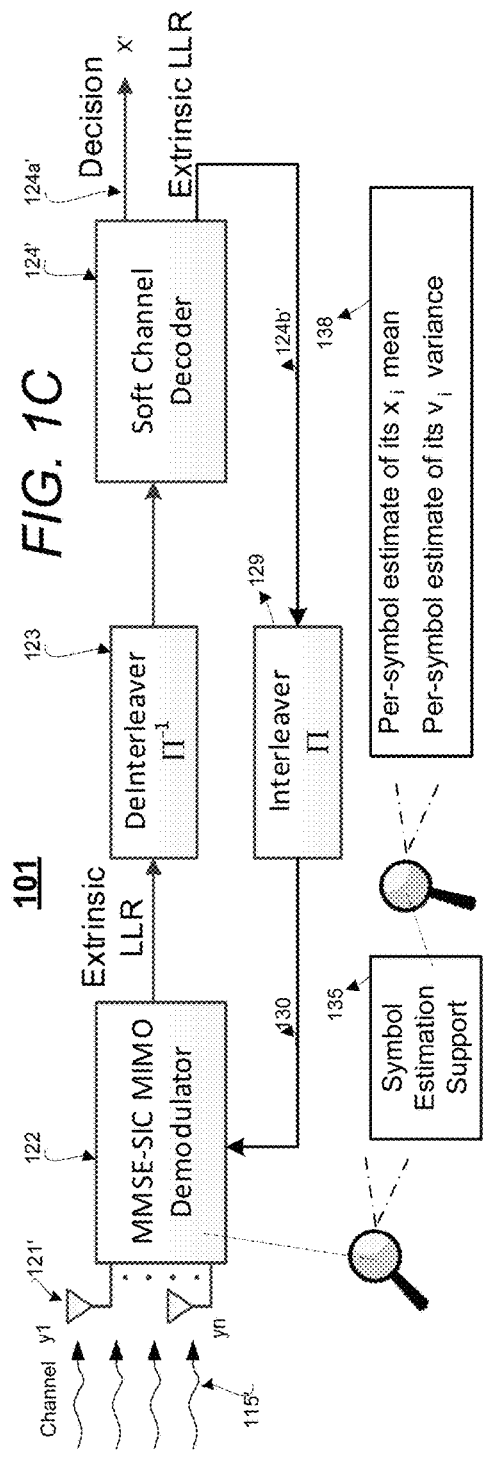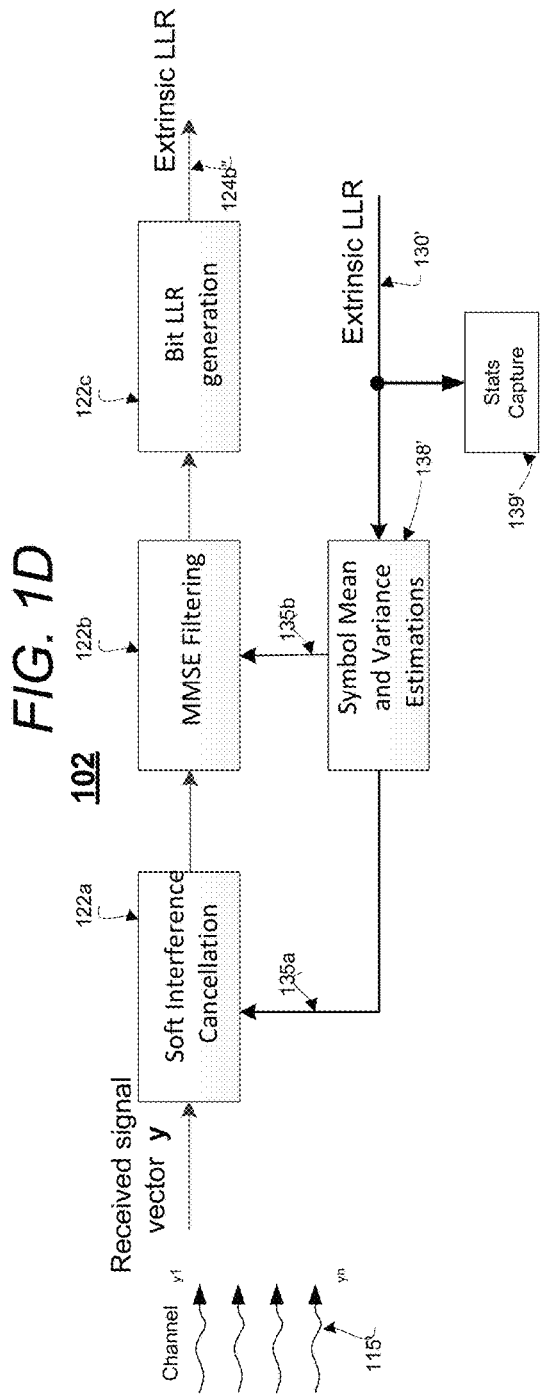

HARDWARE VIRTUALIZATION FOR MEAN AND VARIANCE ESTIMATIONS OF QAM SYMBOLS

CLAIM OF PRIORITY

The present application claims priority from U.S. Provisional Patent Application No. 62/436,202, entitled "HARDWARE VIRTUALIZATION FOR MEAN AND VARIANCE ESTIMATION OF QAM SYMBOLS," by Yue et al., filed Dec. 19, 2016, incorporated by reference herein in its entirety.

BACKGROUND OF THE INVENTION

A technique used for digital information detection in so-called, Soft Interference Cancellation (SIC) receivers relies on iterative feedback of log likelihood ratio signals (LLR's). The SIC utilizes progressively improved estimations of the more likely bit sequences to have been received through a noisy channel given a known constellation of the symbols representing those bit sequences. Within this technique, the soft symbol means and variances of the constellation symbols are determined. However, circuitry for generating the soft symbol means and variances tends to be large, complex and slow in performance. Also for wireless systems with multiple user connections, the circuitry has to finish the symbol estimation for multiple data streams with different constellation orders within a deadline. Efficient circuitry implementation with flexible and fast processing of multiple data streams is desirable.

SUMMARY

In one embodiment, an apparatus is provided that includes a communication device such as a transmitter or receiver configured to convert a plurality of input signals into baseband signals for digital processing, and a signal processor configured to generate from at least one baseband signal a stream of logarithmic likelihood ratio values. The signal processor includes a plurality of estimation circuits configured to produce representations of mean or second moment estimations for quadrature amplitude modulation (QAM) based on a plurality of input signals including a stream based on logarithmic likelihood ratio values. Each estimation circuit includes a set of inputs and a set of outputs associated with Eta and Xi values used in the plurality of estimation circuits for the mean or second moment estimations. The apparatus includes a control circuit coupled to the plurality of estimation circuits. The control circuit is configured to alternately switch the plurality of estimation circuits between sequential and parallel processing of the mean estimations or hybrid of sequential/parallel processing. The control circuit is configured to provide the set of outputs of each estimation circuit to the set of inputs of said each estimation circuit for sequential processing. The control circuit is configured to provide the set of outputs of a subset of the plurality of estimation circuits to another estimation circuit of the plurality for parallel processing.

In one embodiment, an apparatus is provided that includes an antenna configured to receive a plurality of input signals, a communication device configured to generate from the plurality of input signals a plurality of quadrature amplitude modulated (QAM) symbols, and a signal processor. The signal processor includes a first circuit configured to generate an output Eta value based on an input Eta value and an output Xi value associated with quadrature amplitude modulated (QAM) symbols. The apparatus includes a second circuit configured to generate a representation of a mean estimation for the QAM symbols. The second circuit is configured to receive a variable QAM normalization factor based on a counter value associated with a number of iterations for a corresponding mean estimation. The first multiplier is configured to receive the output Eta value and generate the mean estimation for each iteration based on combining the output Eta value and the variable QAM normalization factor.

In one embodiment, an apparatus is provided that includes an interface configured to receive a plurality of input signals, a communication device configured to generate from the plurality of input signals a plurality of quadrature amplitude modulated (QAM) symbols, and a signal processor. The signal processor includes a first circuit configured to generate an output by combining an output Eta value and an output quadrature amplitude modulated (QAM) dependent scalar value. The signal processor includes a second circuit configured to generate a representation of a second moment estimation for the QAM symbols. The second circuit is configured to receive a variable QAM normalization factor based on a counter value associated with a number of iterations for a corresponding second moment estimation. The second circuit is configured to receive the output of the first circuit component and generate the second moment estimation for each iteration based on combining the variable QAM normalization factor and the output of the first circuit.

In one embodiment, a method is provided that includes receiving one or more input signals, converting the one or more input signals into a first quadrature amplitude modulated (QAM) signal and a second QAM signal, generating a first data stream of logarithmic likelihood ratio values associated with the first quadrature amplitude modulated (QAM) signal and a second data stream of LLR values associated with the second QAM signal, and allocating from a pool of estimation circuits configured to produce representations of mean estimations or second moment estimations for QAM signals a first set of circuits for the first QAM signal and a second set of circuits for the second QAM signal. Each estimation circuit includes a set of inputs and a set of outputs associated with Eta and Xi values for the mean or second moment estimations. The method includes configuring the first set of circuits for sequential processing, parallel processing, or a combination of sequential and parallel processing by providing the set of outputs for each circuit to the set of inputs for said each circuit. The method includes configuring the second set of circuits for sequential processing, parallel processing, or a combination of sequential and parallel processing by providing the set of outputs for a subset of circuits of the second set to another circuit of the second set.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 1C is a schematic diagram showing a more detailed view of the iterative SIC receiver of FIG. 1B.

FIG. 1D is a schematic diagram showing more detail of the symbol estimation portion of FIGS. 1B and 1C.

DETAILED DESCRIPTION

Figure 1A:
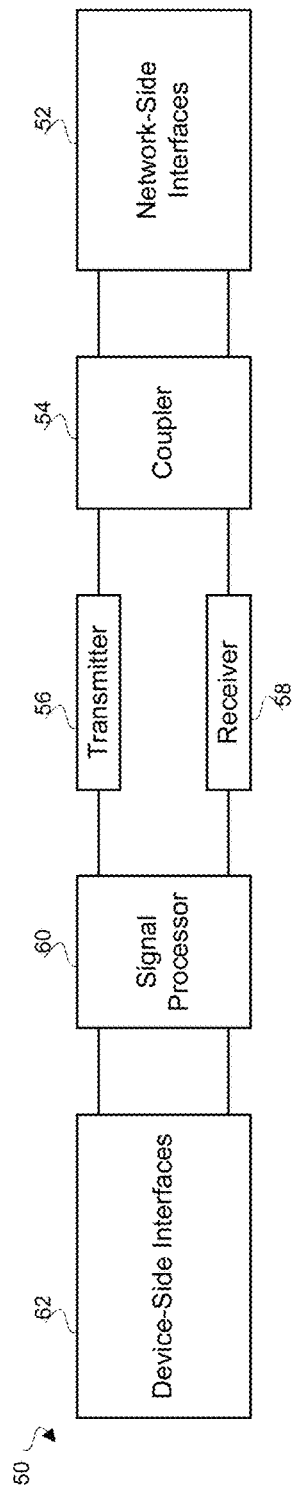
FIG. 1A is a block diagram of an example of a transceiver.

Receivers and transmitters including estimation unit (EU) circuits and related processing techniques for wireless systems are provided. Iterative receivers with soft interference cancellation (SIC) may provide significant performance enhancement for wireless systems. Components of SIC include the mean and variance of quadrature amplitude modulation (QAM) symbols given log-likelihood ratio (LLR) inputs from decoding the outputs or other branch(es) of the receivers. Efficient expressions for QAM symbol mean and variance calculations are utilized with efficient expressions and implementations that are adaptive to different orders of QAM formats. A second moment estimation for a variance estimation is provided having a reduced complexity order with reduced circuitry.

In accordance with one embodiment, an EU circuit includes a mean estimation unit (MEU) circuit and/or a second moment estimation unit (SEU) circuit. The MEU circuit and SEU circuit are adaptive to different orders of QAM formats. Each circuit includes a plurality of inputs and a plurality of outputs that receive and provide values such as Xi, Eta, and counter values associated with the mean or second moment calculation. Each circuit includes an additional input to receive LLR values such as an LLR value $\lambda$ or a value $\tanh(-\lambda/2)$ representing a hyperbolic transfer function of an input LLR value. Each circuit is configured to receive a variable QAM normalization factor so that the circuit can be adapted to different QAM orders. The variable QAM normalization factor is selected based on the counter value associated with a number of iterations for a mean or variance estimation. The MEU circuit generates a signal including a representation of a mean estimation for a QAM data stream. The SEU circuit generates a signal including a representation of a second moment estimation for a QAM data stream.

Each MEU or SEU circuit can be configured for sequential and/or parallel processing. For sequential processing, the inputs such as Xi, Eta, and/or counter values can first be initialized to an initial value. The outputs of the circuit are then provided as the inputs to the circuit. The circuit is processed a number of times to obtain a one dimension estimation of a QAM mean or second moment.

Multiple MEU or SEU circuits can be connected in a chain for parallel processing. The inputs such as Xi, Eta, and/or counter values can first be initialized and the outputs of a subset of circuits in the chain provided to the inputs of a subsequent circuit in the chain. The outputs of the final circuit in the chain can be sampled at predetermined intervals, including an output including the mean or second moment estimation.

Multiple MEU or SEU circuits can be connected in a chain and configured for both sequential and parallel processing, i.e., hybrid processing, to obtain estimation results of one QAM data stream. In one exemplary embodiment, the inputs such as Xi, Eta, and/or counter values can first be initialized and the outputs of a subset of circuits then provided as the inputs to the circuits themselves for processing a number of times before passing the outputs to the inputs of a subsequent circuit. In another exemplary embodiment, the inputs such as Xi, Eta, and/or counter values can first be initialized and the outputs of a subset of circuits in the chain provided to the inputs of a subsequent circuit in the chain. The outputs of one circuit in the chain can be configured as the inputs to one of previous circuits in the chain.

A pool including multiple MEU circuits and/or a pool including multiple SEU circuits are provided in one embodiment, with a control unit for configuring and reconfiguring the pools of circuits for mean and variance estimation for data streams of QAM symbols. The control unit may access multiple data streams having different characteristics such as different block lengths, QAM orders, priorities, etc. The control unit may allocate sets of circuits from the pool of MEU or SEU circuits to process the different data streams based on the variable characteristics. The control unit may determine a number of EU circuits for each set based on the QAM order, block length, priority, etc. After allocating a set of EU circuits for a data stream, the control unit configures the set for sequential or parallel processing. For sequential processing, the control unit connects the outputs of each circuit to its input. For parallel processing, the outputs of a subset of circuits in the set are provided to the inputs of a subsequent circuit in the set.

FIG. 1A is a block diagram of an example of a communication device including a transceiver 50 adapted to transmit and/or receive signaling over a telecommunications network. The transceiver 50 may be installed in a host device including a base station or user terminal, for example. A transceiver in accordance with one embodiment includes a transmitter or a receiver. In another embodiment, a transceiver includes a transmitter and a receiver. As shown, the transceiver 50 comprises a network-side interface 52, a coupler 54, a transmitter 56, a receiver 58, a signal processor 60, and a device-side interface 62. The network-side interface 52 may include any component or collection of components adapted to transmit or receive signaling over a wireless or wireline telecommunications network (e.g., antenna). The coupler 54 may include any component or collection of components adapted to facilitate bi-directional communication over the network-side interface 52. The transmitter 56 may include any component or collection of components (e.g., up-converter, power amplifier, etc.) adapted to convert a baseband signal into a modulated carrier signal suitable for transmission over the network-side interface 52. The receiver 58 may include any component or collection of components (e.g., down-converter, low noise amplifier, etc.) adapted to convert a carrier signal received over the network-side interface 52 into a baseband signal. The signal processor 60 may include any component or collection of components adapted to convert a baseband signal into a data signal suitable for communication over the device-side interface(s) 62, or vice-versa. The device-side interface(s) 62 may include any component or collection of components adapted to communicate data-signals between the signal processor 510 and components within the host device (e.g., processing system, local area network (LAN) ports, etc.).

The transceiver 50 may transmit and receive signaling over any type of communications medium. In some embodiments, the transceiver 50 transmits and receives signaling over a wireless medium. For example, the transceiver 50 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 52 comprises one or more antenna/radiating elements. For example, the network-side interface 52 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 50 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 1B:
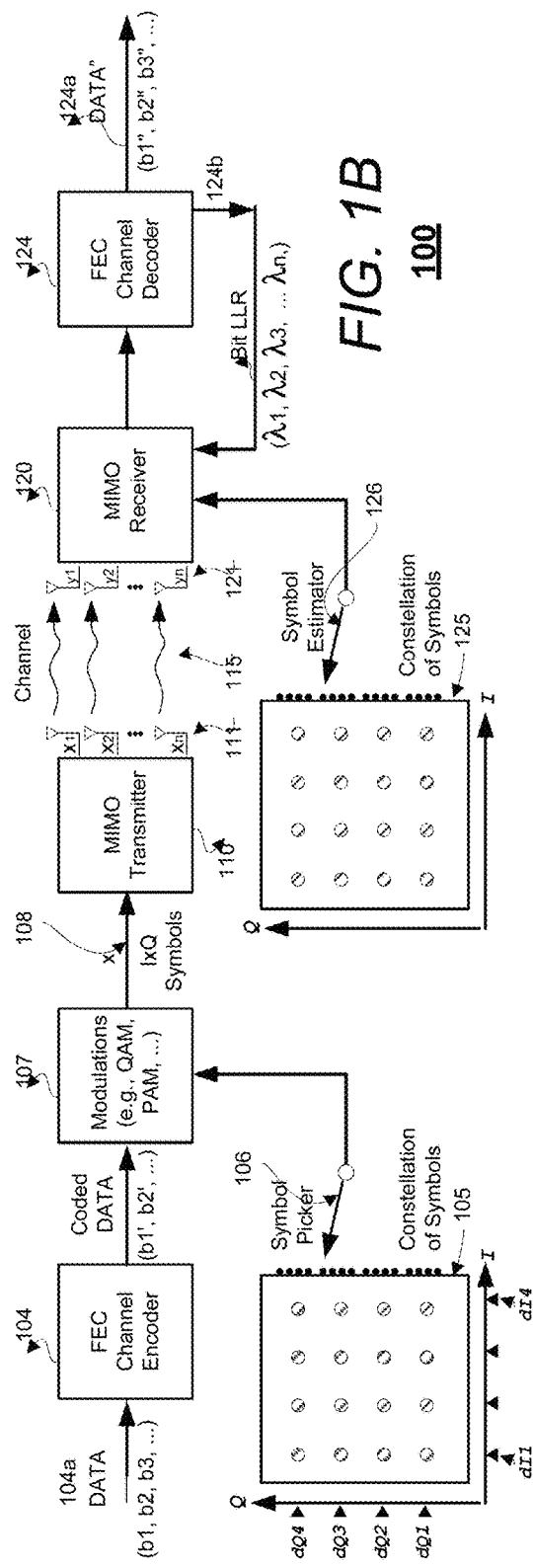
FIG. 1B is a schematic diagram of one embodiment of a multiple-input/multiple-output (MIMO) communication system using an iterative SIC receiver.

FIG. 1B is a block diagram illustrating an exemplary MIMO (multiple-input, multiple-output) communication system 100 having a multi-port transmitter 110 (e.g., multi-antenna transmitter) and a multi-port receiver 120 (e.g., multi-antenna receiver) where the transmitter 110 is coupled to the receiver 120 by way of a communications channel 115 susceptible to noise and/or inter-symbol interference. The iterative SIC receiver relies on iterative updates of log-likelihood ratio signals (LLR's) to detect information bit sequences obtained from a constellation array of symbols where the detection determines the most likely of bit sequences to have been transmitted over a noisy channel having a certain signal to noise ratio (SNR).

Iterative receivers with soft interference cancellation (SIC) may provide significant performance enhancement for wireless systems. At the base station side in the Long-Term Evolution (LTE) cellular systems, an iterative receiver with SIC can be applied to LTE uplink single-carrier frequency division multiple access (SC-FDMA), uplink multiuser MIMO, and the uplink coordinate multipoint (CoMP) reception with SIC (CoMP SIC).

Log-likelihood ratio signals (LLR's) provide a comparison between two model outcomes. Because it is based on a logarithm of the ratio of probabilities (likelihoods; e.g., L1/L2), if the two probabilities are the same, the log of their ratio is zero (Log(1)=0). If the numerator probability is greater, meaning the ratio is greater than one, the log of the ratio is positive. If the denominator probability is greater, meaning the ratio is less than one, the log is negative. Thus the sign of the result gives an indication of which model provides a better fit for given conditions and the absolute value gives an indication of degree that one model is better than the other. For the case where the competing models are that of a binary bit being zero or one, the LLR is the logarithm of the ratio of the probability of the bit being zero over the probability of the bit being one.

A variety of techniques may be used for reconstructing at the receiver side an output bitstream 124a whose represented symbols substantially match input symbols represented by an input bitstream 104a at the transmitter side. More specifically, the input bitstream 104a is passed through a forward error correction encoder (FEC) 104 and the coded data output is then applied to a signal modulator 107, wherein multiple quadrature modulations are employed such as phase versus amplitude quadrature modulation (QAM) where orthogonal modulation schemes (denoted by the $\mathcal{Q}$ and $\mathcal{I}$ axes) are used to distinguish among discrete symbols within a predetermined constellation 105 of such symbols. Typically, the constellation is a square one where the maximum number of discrete positions (e.g., dQ1 through dQ4) along the $\mathcal{Q}$ axis match the maximum number of discrete positions (e.g., dI1 through dI4) along the I axis and the size of the constellation is typically denoted by a N' integer such as N'=4 representing the maximum number of discrete positions along just one of the orthogonal axes. In contrast to N', the non-italicized notation Q used herein is a number of bits mapping to a N'-PAM symbol such that N'=$2^Q$. In the schematic of FIG. 1B, the transformation of the coded data bits (e.g., b1', b2', . . . ) into orthogonally modulated output signals is represented by a symbol picker 106 which converts gray-coding or other coding of the input digital signals into corresponding discrete positions within the symbols constellation 105. Because the discrete positions within the symbols constellation 105 are spaced apart from one another by known distances in the complex space and the bit sequence associated with each axis is known and can be decoupled due to the squared QAM, it is possible to digitally model the likelihoods that certain bit sequences associated with the $\mathcal{Q}$ axis will go hand in hand with other bit sequences associated with the $\mathcal{I}$ axis.

The modulated signal X (108) is then applied to the multiple output transmitter 110 which in one embodiment has a plurality of spaced apart radio frequency antennas 111 from which there are emitted a corresponding plurality of spread spectrum signals X1 through Xn for transmission through the channel 115 and receipt by another plurality of spaced apart antennas 121 where the received signals are represented respectively by phase/amplitude vectors y1 through yn. The corresponding MIMO receiver 120 demodulates the received signals and passes them to an FEC decoder 124. Decoder 124 may be part of signal processor 60 in one embodiment. A first output of the decoder represents the reconstructed data stream 124a (e.g., bit sequence b1", b2", b3", . . . ). A second output of the decoder provides a feedback 124b of log-likelihood ratio signals (LLR's) which are also represented herein by the Greek letter lambda ($\lambda$). In one embodiment, before final decisions are reached on the bits of the reconstructed data stream 124a (e.g., bit sequence b1", b2", b3", . . . ), a plurality of iterations are used in conjunction with the fed back LLR signals (e.g., $\lambda_1$, $\lambda_2$, $\lambda_3$, . . . ) so as to get a better estimation of what the reconstructed binary bits should be (either a "0" or a "1"). In FIG. 1B, a schematic of a symbol estimator 126 is used to represent how the plural iterations iteratively determine a more likely discrete output decision within the predetermined constellation 125 of symbols. Such determination may be separately carried out for the $\mathcal{Q}$ axis and for the $\mathcal{I}$ axis and then the combination of results determines the final symbol decision.

Referring to FIG. 1C, an exemplary embodiment 101 is schematically shown for the receiver side and more specifically for a symbol estimation portion of the receiver which relies on iterative determination of symbol mean and variance statistics. Demodulator 122, deinterleaver 123, soft channel decoder, interleaver 129, symbol estimation support circuit 135, and/or estimation support circuitry 138 may be part of signal processor 60. In the illustrated portion, received signals y1 through yn are provided by channel 115' to a corresponding array 121' of antennas where the latter couple to a corresponding SIC MIMO demodulator 122. The demodulator couples to an LLR de-interleaver 123 whose output signals are supplied to a soft channel decoder 124'. The decoder 124' has a first output 124a' from which the detected bit sequences are produced and a second output 124b' from which updated LLR signals are produced. The updated LLR signals are fed back and passed through interleaver 129 and returned (130) to the demodulator 122 for use in carrying out soft symbol estimation. The demodulator circuit 122 includes a soft symbol estimation support circuit 135. Within the support circuit 135 there are provided circuits 138 for performing per-symbol estimation of reconstructed output means ($\tilde{x}_i$) and per-symbol estimations of reconstructed output variances ($\tilde{v}_i^2$).

Referring next to FIG. 1D, shown is a more detailed embodiment 102 for the estimation support circuitry 138 of FIG. 1C for aforementioned processes. The estimation support circuitry includes a soft interference cancellation module 122a, a MMSE filtering module 122b and a bit LLR generating module 122c connected in sequence as shown. The fed back LLR signal 130' is supplied to a symbol mean and variance estimation circuit 138'. Outputs of the estimation circuit 138' are respectively fed back as signal 135a to the soft interference cancellation module 122a and as signal 135b to the MMSE filtering module 122b. Circuit size and complexity may disadvantageously increase as the size of the symbol mean and variance estimation circuit 138' increases, for example when the maximum number of discrete, per access points in a square constellation increases (e.g., from Q=3 to Q=4, 5 or higher). Also, in some designs it may be desirable to provide for different values of Q. However, because the values of the multiplicands for digital signal multipliers such as 316, 326 and 336 change with different values of Q, it may be necessary to provide for different sets of such circuits for each contemplated value of Q. Although not typically part of a receiver, FIG. 1D shows the option of a statistical capture unit 139' operatively coupled to the to the LLR feedback line 130' and configured to collect statistics about the distribution of LLR values as the circuit cycles through iterative updates. The collected statistics may be used to determine when various ranges of LLR values appear.

By way of example and not limitation, a signal model is described for explanatory purposes. An iterative SIC receiver can be considered having minimum mean square error (MNISE) filtering for an MIMO system including $M_T$ transmit antennas and $M_R$ receive antennas. In typical scenarios, it can be assumed that $M_R \geq M_T$. The transmitted QAM symbol vector can be denoted as $x=[x_1, \ldots, x_{M_T}]^T$. The received signal is then given by the following equation:

$$y = Hx + n = \sum_{i=1}^{M_T} h_i x_i + n, \quad \text{Equation 1}$$

In Equation 1, $H=[h_1, \ldots, h_{M_T}]$ is the $M_R \times M_T$ complex channel matrix, the component $h_i$ is the channel vector from the ith transmit antenna to the receiver antenna array, and n denotes the i.i.d. zero-mean complex white Gaussian noise vector with unit variance for each entry. In other words, n: $C_N(0, I)$ and I is an $M_R \times M_R$ identity matrix. It can be considered that the QAM symbol sequence sent from all transmit antennas are jointly coded with one channel code. The block fading model can also be considered in which the channel gain matrix H remains constant for the entire code block.

Given the extrinsic log-likelihood ratios (LLRs) of the coded bits from the soft channel decoder in the previous iteration, the mean estimation of the QAM symbol $x_i$ can be calculated, where $x_i$ is denoted as $\tilde{x}_i = E\{x_i\}$, $i=1, \ldots, M_T$. To improve the detection of the ith QAM symbol $x_i$, the SIC can be performed for QAM symbols $x_j$, $j \neq i$. The result signal is then given by:

$$y_i = h_i x_i + \sum_{j \neq i} h_j (x_j - \tilde{x}_j) + n. \quad \text{Equation 2}$$

The linear MMSE filter can then be obtained, given by:

$$w_i = \left( h_i h_i^\dagger + \sum_{j \neq i} \tilde{\sigma}_j^2 h_j h_j^\dagger + I \right)^{-1} h_i, \quad \text{Equation 3}$$

In Equation 3, $\dagger$ denotes matrix Hermitian, and $\sum_{j \neq i} \tilde{\sigma}_j^2 h_j h_j^\dagger$ is the covariance of the residual interference after SIC. The following equation then applies:

$$\tilde{\sigma}_j^2 = \text{var}\{x_j - \tilde{x}_j\} = E\{|x_j|^2\} - |\tilde{x}_j|^2. \quad \text{Equation 4}$$

The MMSE-SIC filtering output is then given by:

$$\tilde{x}_i = w_i^\dagger y_i. \quad \text{Equation 5}$$

If it is assumed that $\tilde{x}_i$ is Gaussian distributed, the LLRs for the binary labeling bits that are mapped to the QAM symbol $x_i$ can be obtained. The extrinsic information can then be sent to the soft channel decoder 124'. The output extrinsic LLRs from the soft decoder are then fed back as the prior LLRs for the next iteration of MMSE-SIC. Initially, the soft estimate is $\tilde{x}_i = 0$.

From the above, it can be seen that the soft QAM estimation, $\tilde{x}_i$, and the variance of the QAM symbol $\tilde{\sigma}_i^2$ are determined for the estimation of the residual interference. Further, when the soft estimation $\tilde{x}_i$, is obtained, the variance estimation using the estimation of the second moment of the QAM symbol, $E\{|x_i|^2\}$ is determined.

An N-QAM constellation set $S_{QAM} = \{s_1, \ldots, s_N\}$ can be considered, with each symbol mapped from a length-J binary sequence, $b_1, \ldots, b_J$, where $J = \log_2 N$ and $b_i \in \{0,1\}$. It can be assumed that the QAM symbols are integer values on I and Q components, i.e., $2z+1$, $z=0,\pm 1, \ldots$. The QAM signal can be normalized for a unit average power with the scaling factor of $$\frac{1}{\sqrt{E_N}},$$

where $E_N$ is the variance of the QAM inputs. Assuming equiprobable inputs, Equation 6 is given:

$$E_N = \frac{1}{N} \sum_{n=1}^{N} |S_n|^2 = \frac{2}{3}(N-1). \quad \text{Equation 6}$$

Given the LLR $\lambda_i$ for $b_i$, $i=1, \ldots, J$, mapped to the QAM symbol $x_{qam} \in S_{QAM}$, the soft symbol or the mean estimation of $x_{qam}$ can be formed as:

$$\tilde{x}_{qam} = \sum_{s \in S_{QAM}} s \, Pr(x_{qam} = s) = \sum_{n=1}^{N} S_n \prod_{i=1}^{J} P_{b_i}(s_{n,1}), \quad \text{Equation 7}$$

In Equation 7, $s_{n,i}$ denotes the ith bit in the length-J bit sequence that is mapped to the QAM symbol $s_n$, $$P_{b_i}(i) \triangleq Pr(b_i = i),$$

$i \in \{0,1\}$, and $$P_{b_i}(0) = (e^{-\lambda_i} + 1)^{-1}, \quad P_{b_i}(1) = (e^{\lambda_i} + 1)^{-1}.$$

It can be seen that the overall complexity from (7) is O(N log N).

For squared QAM with orthogonal mapping of I and Q components, the QAM symbol estimation can be decoupled to two pulse-amplitude modulation (PAM) estimations, given as:

$$\tilde{x} = \sum_{s \in S_{PAM}} s P_x(s) = \sum_{n=1}^{N'} S_n \prod_{i=1}^{Q} P_{b_i}(s_{n,i}), \quad \text{Equation 8}$$

In the above equation, $N' = \sqrt{N}$, $$Q = \frac{J}{2},$$

and $s_{n,j}$ is now the ith bit mapped to the PAM symbol $s_n$. It can be seen that the PAM estimation in the above equation requires QN' multiplications and N'−1 additions. Thus overall the squared QAM estimation needs $2Q\sqrt{N}$ multiplications and $2\sqrt{N}-2$ additions. The complexity order is then $O(\sqrt{N} \log N)$, which is lower than the earlier described approach.

As described above, after obtaining the soft symbol estimate, the estimation of the variance of the residual interference after SIC becomes the second moment estimation. The general definition of the second moment estimation is given as:

$$\tilde{v}_{qam}^2 \triangleq E\{|x_{qam}|^2\} = \sum_{s \in S_{QAM}} |s|^2 Pr(x_{qam} = s) = \tilde{v}_I^2 + \tilde{v}_Q^2, \quad \text{Equation 9}$$

In the above equation, $\tilde{v}_I^2 \triangleq \sum_{s \in S_{QAM}} s_I^2 Pr(x_{qam} = s)$ and $\tilde{v}_Q^2 \triangleq \sum_{s \in S_{QAM}} s_Q^2 Pr(x_{qam} = s)$. Additionally, $s_I$ and $s_Q$ denote the I and Q values of the QAM symbol s, respectively. The complexity of the estimation using the above expression is O(N log N).

Similarly as for mean estimation, the squared QAM can be considered which can be decoupled to two orthogonal PAMs. Assuming an N'-PAM constellation set $S_{PAM}=\{s_1,\ldots,s_{N'}\}$ with $N'=2^Q$, the second moment estimation for PAM symbols is given as:

$$\tilde{v}_{pam}^2 \triangleq \sum_{n=1}^{2^Q} s_n^2 Pr(x=s_n). \qquad \text{Equation 10}$$

The above equation can be applied to obtain $\tilde{v}_I^2$ and $\tilde{v}_Q^2$ in (9) separately. The complexity is then reduced to $O(\sqrt{N}\log N)$.

The expressions for efficient mean and variance estimations can be obtained for both squared QAM and non-squared QAM. The squared QAM can be considered as an example. For squared QAM, the soft mean and variance (or specifically the second moment) estimations can be decoupled into two PAM estimations. The binary reflect Gray code (BRGC) based mapping is also considered, which is a common Gray mapping for QAM employed in current wireless systems.

Figures 2, 3:
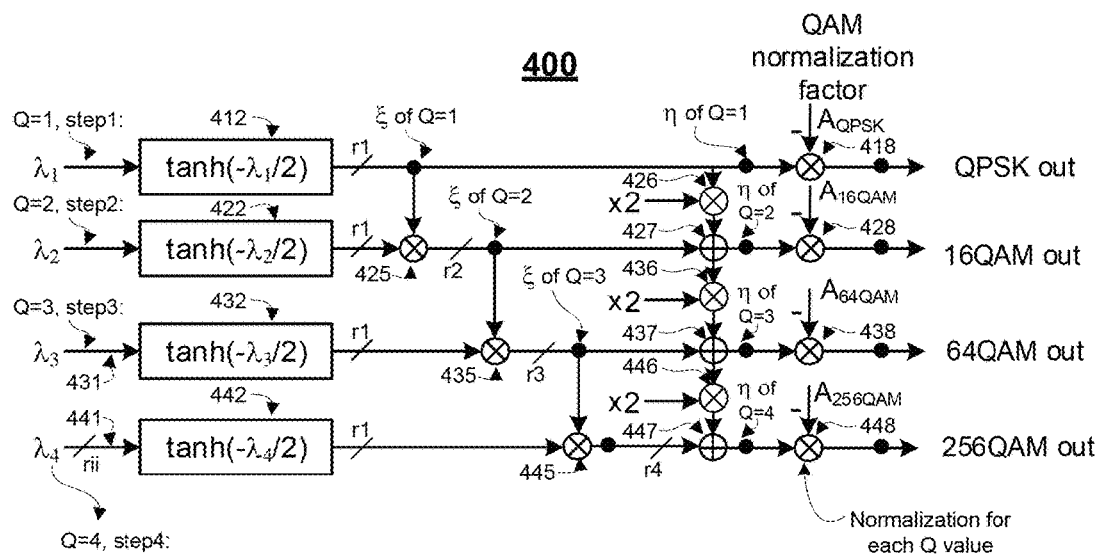
FIG. 2 is a depiction of an example of a $2^Q$-PAM symbol with Gray code mapping.
FIG. 3 is a schematic diagram of a mean determining circuit.

FIG. 2 depicts an example of a $2^Q$-PAM symbol with Gray code mapping. The soft mean estimation is given by:

$$\tilde{x} = -\sum_{i=1}^{Q} 2^{Q-i} \prod_{j=1}^{i} \tanh\left(-\frac{\lambda_j}{2}\right). \qquad \text{Equation 11}$$

The above result is derived for PAM symbols $2z+1$ before the normalization with a unit average power. Hence, a scaling factor $$A_{N-QAM} = \frac{1}{\sqrt{E_N}}$$

is the applied to the result in (11) for both I and Q components for QAM normalization. Some methods or procedures for soft mean estimation based on (11) may not provide an efficient architecture for adaptive QAM modulations.

A more efficient technique for soft mean estimation in one example may be described by:

Initially set $\eta=0$ and $\xi=1$.

For $i=1\ldots,Q$, update $\xi$ and $\eta$ sequentially as $$\xi \Leftarrow \xi \cdot \tanh\left(-\frac{\lambda_i}{2}\right), \text{ then } \eta \Leftarrow 2\eta + \xi. \qquad \text{Equation 12}$$

Obtain the PAM soft estimate as $\tilde{x}=-\eta$ using the last update of $\eta$.

In this method, the calculation and the update of $\eta$ does not include the modulation dependent parameter $2^{Q-i}$. The enables the circuit implementation for one iteration to be reusable for different modulations and/or can make the implementation scalable for higher order QAM modulations. The exemplary implementation for QAM mean estimation according to the above method is illustrated in FIG. 3 where the scaling factor $$A_N = \frac{1}{\sqrt{E_N}}$$

for an N-QAM is applied in the end for the normalization. It is seen from FIG. 3 that for the mean estimations of PAM symbols, corresponding to the I or Q component of a squared QAM, one circuitry implementation can be applied to any Gray mapped PAM or square QAM without any parameter change. This may desirable for the wireless communication systems as adaptive modulation is commonly employed to improve the throughput efficiency for channel fluctuations. The implementation is scalable to any higher order QAM formats, which facilitates the implementation and verification procedures for the application-specific integrated circuit (ASIC) when new higher order PAM or QAM modulation is introduced to the system specification.

Referring to FIG. 3, the illustrated embodiment 400 is a pipeline circuit that has plural tapped outputs, QPSK_out, (4×4)QAM_out, (8×8)QAM_out, and (16×16)QAM_out for the respective cases where the maximum dimension of the respective square constellation of symbols is correspondingly, Q=1, Q=2, Q=3 and Q=4 of each of the $I$, $Q$ dimensions of the corresponding quadrature scheme. The pipeline circuit is implemented within signal processor 60 in one embodiment. The pipeline circuit exclusively or partially may be implemented elsewhere within the transceiver circuitry. Although not shown the series can be continued to cover the cases of Q=5, Q=6 and so on. Other than the Q specific normalization factor, the circuit 400 utilizes a repeated design that produces a product of tanh( ) outputs and a sum based on left shifted Eta's ($\eta$'s). Each update of $\eta$ is the sum of the left shifted $\eta$ of the previous step (corresponding to the $2\eta$ factor in the above process) summed with the products of tanh( ) results obtained in a current step.

In FIG. 3, each of the successive steps of the above described process can define a respective horizontal row for a corresponding Q in which, for the case of Q1 and step 1, the corresponding Xi values ($\xi$'s) can be generated by applying the corresponding Bit LLR's (($\lambda 1$'s) to a first tanh(x) generating circuit block 412 programmed or otherwise configured to produce a corresponding tanh($-\lambda/2$) signal for the respective input signals. The tanh( ) function has a range $1.0 \geq \tanh(x) \geq -1.0$ (and yet more practically narrower than that when the inputs are LLR values so that it can be implemented with a LUT and/or by way of other designs including piecewise approximation designs) and the output signal of the first circuit block 412 therefore represents a floating point or fixed point digital value in that range where precision and accuracy are determined by consideration of design goals and available circuit space on a corresponding monolithically integrated circuit (not shown). The Eta values ($\eta$'s) for the case of Q1 and step 1 are simply 1 times the corresponding Xi values ($\xi$'s) and thus simple wire provides those to a normalizing, general purpose multiplier 418 which receives as another multiplicand input the negatively signed $A_{QPSK}$ signal and produces the corresponding QPSK_out signal for optional use when pulsed amplitude modulation is used.

For the case of Q2 and step 2, the corresponding Xi values ($\xi$'s) can be generated by applying the corresponding Bit LLR's (($\lambda 2$'s) to a second tanh( ) generating circuit block 422 configured to produce a corresponding tanh($+\lambda/2$) signal for the respective input signals where the latter signals are applied as first multiplicands to a general purpose second digital multiplier 425 while the Xi values (ξ's) of step 1 are applied as second multiplicands to the same general purpose digital multiplier 425. The outputs of the second digital multiplier 425 are supplied to a first digital adder 427. A second input of the first digital adder 427 receives a left shifted (by one bit) and zero padded version of the Eta values (η's) of step 1 to thereby form the Eta values (η's) for the case of Q2 and step 2. Although a multiply by 2 symbol is shown at 426, it is to be understood that this function is can be performed with a minimized circuit that simply shifts its received bits by one bit place and inserts a padding zero bit at the least significant bit location (LSB) of its output. A general purpose, normalizing multiplier 428 receives the Eta values (η's) for the case of Q2 and step 2 as first multiplicand inputs and receives as another multiplicand input the negatively signed $A_{16QAM}$ signal and produces the corresponding 16QAM_out signal for optional use when 4×4 quadrature amplitude modulation is used.

When the Eta values (η's) of step 1 are multiplied by 2 (e.g., by shift circuit 426) and thereafter supplied into the addition performed by adder circuit 427, the significance of that ×2 addend becomes relatively more important to the addition result and conversely, the significance of the next addend in the chain (e.g., the one obtained from multiplier 425) becomes relatively less important to the addition result. Moreover, the products of multipliers 425, 435, 445, etc. are those of multiplying by values all less than one so that as the chain of multiplications continues, the absolute values of the products keep shrinking.

Similarly, for the case of Q3 and step 3, the corresponding Xi values (ξ's) can be generated by applying the corresponding Bit LLR's ((λ3's) to a third tanh( ) generating circuit block 432 configured to produce a corresponding tanh(−λ/2) signal for the respective input signals where the latter signals are applied as first multiplicands to a general purpose third digital multiplier 435 while the Xi values (ξ's) of step 2 are applied as second multiplicands to the same digital multiplier 435. The outputs of the second digital multiplier 435 are supplied to a second digital adder 437. A second input of the second digital adder 437 receives a left shifted (by one bit) and zero padded version of the Eta values (η's) of step 2 to thereby form the Eta values (η's) for the case of Q3 and step 3. Once again, although a multiply by 2 symbol is shown at 436, it is to be understood that this function can be performed with a minimized circuit that simply shifts its received bits by one bit place left and inserts a padding zero bit at the least significant bit location (LSB) of its output. A general purpose, normalizing multiplier 438 receives the Eta values (η's) for the case of Q3 and step 3 as first multiplicand inputs and receives as another multiplicand input the negatively signed $A_{64QAM}$ signal and produces the corresponding 64QAM_out signal for optional use when 8×8 quadrature amplitude modulation is used.

Moreover, and yet again in repeating circuit structure fashion, for the case of Q4 and step 4, the corresponding Xi values (ξ's) can be generated by applying the corresponding Bit LLR's (λ4's) to a third tanh( ) generating circuit block 442 configured to produce a corresponding tanh(−λ/2) signal for the respective input signals where the latter signals are applied as first multiplicands to a general purpose, fourth digital multiplier 445 while the already produced Xi values (ξ's) of step 3 are applied as second multiplicands to the same general purpose digital multiplier 445. The outputs of the third digital multiplier 445 are supplied to a third digital adder 447. A second input of the third digital adder 447 receives a left shifted (by one bit) and zero padded version of the already produced Eta values (η's) of step 3 to thereby form the Eta values (η's) for the case of Q4 and step 4. Once again, although a multiply by 2 symbol is shown at 446, it is to be understood that this function is can be performed with a minimized circuit that simply shifts its received bits by one bit place left and inserts a padding zero bit at the least significant bit location (LSB) of its output. A general purpose, normalizing multiplier 448 receives the Eta values (η's) for the case of Q4 and step 4 as first multiplicand inputs and receives as another multiplicand input the negatively signed $A_{256QAM}$ signal and produces the corresponding 256QAM_out signal for optional use when 16×16 quadrature amplitude modulation is used.

As described above for a variance estimation, a calculation for a second moment estimation $\tilde{v}^2$ for a PAM symbol can be performed. An efficient expression may be provided where given the LLRs $\lambda_i=1, \ldots, Q$, the second moment estimate $\tilde{v}^2$ for a $2^Q$-PAM symbol with Gray mapping can be computed as:

$$\tilde{v}^2 = C_Q + \sum_{i=2}^{Q} 4^{Q-i+1} \sum_{j=2}^{i} 2^{i-j} \prod_{k=j}^{i} \tanh\left(-\frac{\lambda_k}{2}\right), \quad \text{Equation 12}$$

In Equation 12, $C_Q$ is a constant depending on Q and can be obtained iteratively by:

$$C_q = 4C_{q-1}+1, q=1, \ldots, Q, \text{ with } C_0=0. \quad \text{Equation 13}$$

The estimation in Equation 12 is before the normalization. After the estimation, the normalization factor $$\frac{1}{E_N}$$

can then be applied for the N-QAM modulation.

Various algorithms based on Equation 12 can be used to obtain the second moment estimation, which results in the complexity in the order of $O((\log N)^2)$. To reduce the computation complexity to the order $O(\log N)$, a technique can be used, described by:

Obtain $\tanh\left(-\frac{\lambda_i}{2}\right), i = 2, \ldots, Q$, by $LUT$.

Initially set $\eta = 0, \zeta = \tanh\left(-\frac{\lambda_2}{2}\right)$.

For $i = 3, \ldots, Q$,

Update $\zeta$ as $\zeta \Leftarrow (2\zeta + 1) \cdot \tanh\left(-\frac{\lambda_i}{2}\right)$.

Update $\eta$ by $\eta \Leftarrow 4\eta + \zeta$.

Obtain $red\tilde{v}^2 = 4\eta + C_Q$ using the latest update of $\eta$.

From the above method, it can be seen that there is only one for loop used instead of two as in some possible implementations. The additional complexity introduced is the addition +1 when updating $\zeta$ in each iteration. The scalability is illustrated. With another iteration of updating $\zeta$ and $\eta$ with the input of $\lambda_{Q+1}$, the moment estimation for $2^{Q+1}$-PAM from the results of $2^Q$-PAM can be obtained.

Figure 4:
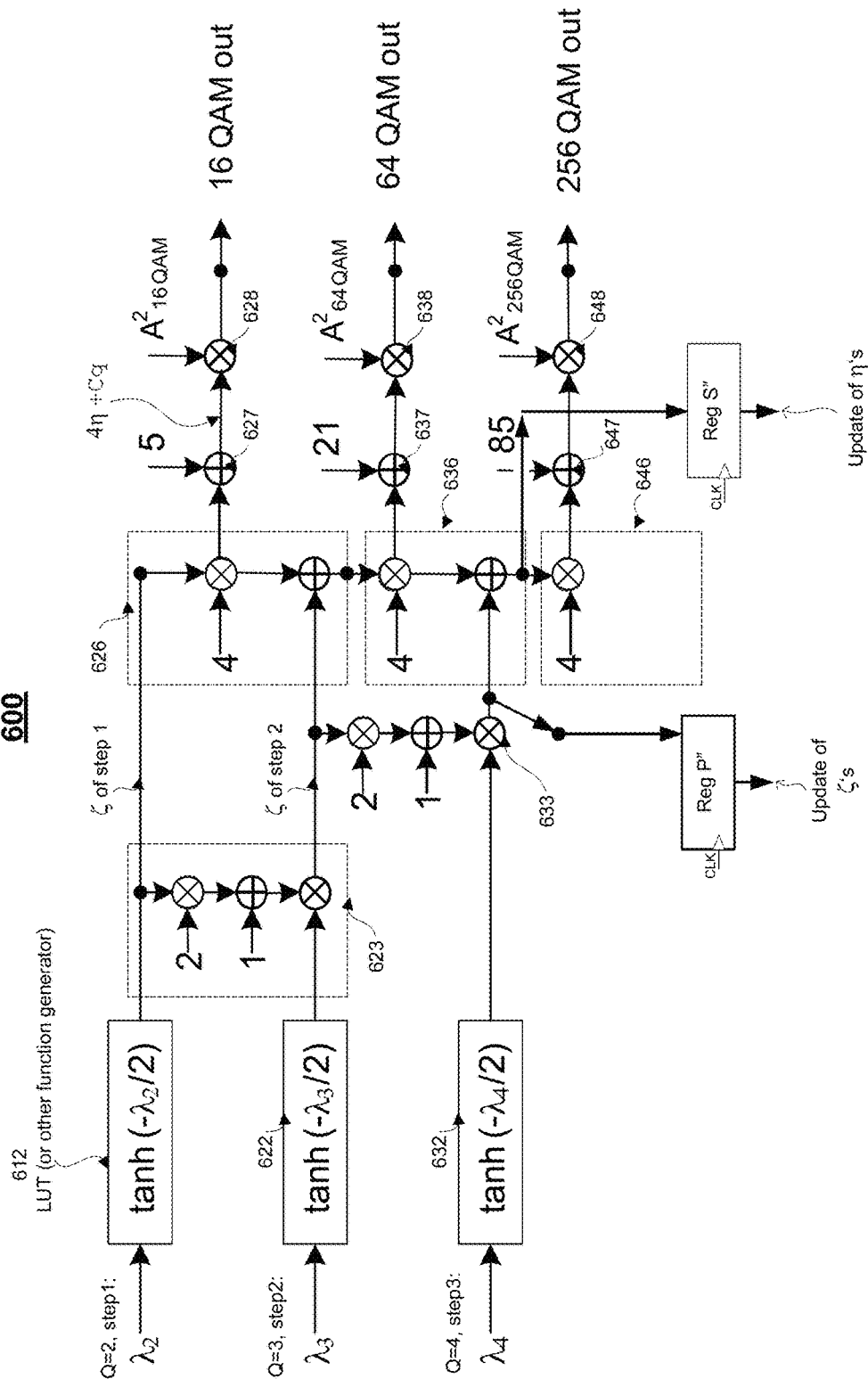
FIG. 4 is a schematic diagram of a second moment determining circuit for variance estimation.

One possible implementation based on the above technique is depicted in FIG. 4. In FIG. 4, the illustrated circuit 600 for producing output signals representing estimated second moment for eventually estimating variances for the cases of (4×4) QAM, (8×8) QAM and (16×16) QAM. The illustrated tanh(x) function generating units 612, 622, 632 can be same ones as used in the mean estimation circuits for the corresponding LLR signals. The illustrated repetitive circuit structures such as that in dashed block 623 and such as that in dashed block 626 can be further repeated for the next sequential cases of Q=5, Q=6 and so on. The resulting updates of Zeta's for the variance estimation and the resulting updates of Eta's also for the variance estimation may be captured in pipelining registers just such as the illustrated Reg P" and Reg S". Adders such as 627, 637 and 647 provide the specific Cq constants for the respective values of Q.

A generalized N-QAM estimation circuit can be provided that includes circuitry for processing an N-QAM symbol. A common estimation circuit for the estimation is provided, improving the throughput of the received data stream, and also simplifying the logistics when implementing parallel processes for multiple LLR data streams with different modulation formats or a single stream with improved parallelism.

Figure 5:
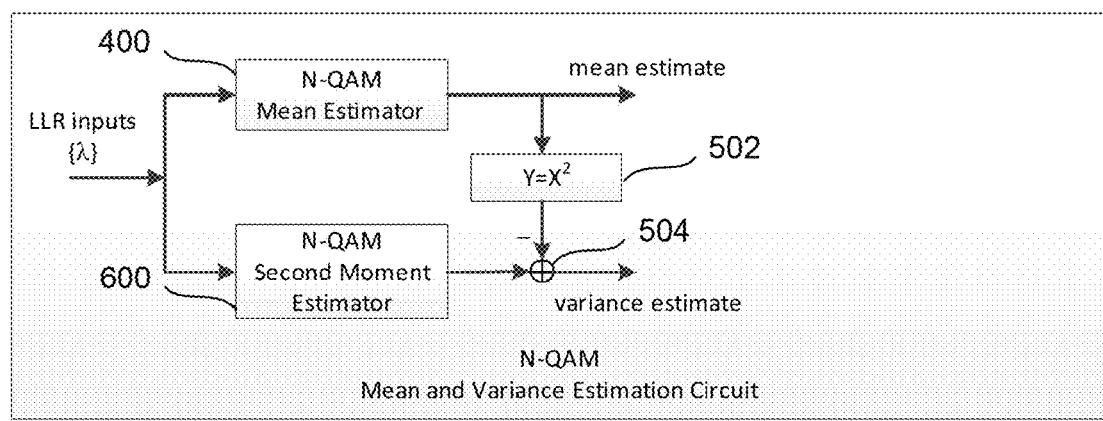
FIG. 5 is a block diagram of an N-QAM mean and variance estimation circuit.

Based on scalable architecture approaches, a generalized N-QAM mean and variance estimation circuit for any N-QAM format can be formed as shown in FIG. 5. This approach permits the mean and variance functions to be virtualized. A control unit (not shown) provides the LLR inputs and the QAM format and the generalized estimation circuit computes and samples the estimation outputs. The estimation circuit of FIG. 5 can be implemented within signal processor 60 in one embodiment. The estimation circuit may be implemented elsewhere within the transceiver circuitry, either exclusively or partially.

As illustrated in FIG. 5, the LLR inputs from a data stream are provided to both an N-QAM mean estimation circuit and an N-QAM second moment estimation circuit. The output of the mean estimation circuit is provided an output of the N-QAM estimation circuit. It is also provided to an exponential circuit 502 that generates an output based on raising the value of the mean estimation by an exponential factor of 2.

The output of the second moment estimation circuit is provided as an input to an adder 504. The adder also receives the negative (multiplying by −1) output of the exponential circuit. The two outputs are combined by the adder and provided as a second output of the N-QAM estimation circuit representing the variance estimation.

Figure 6:
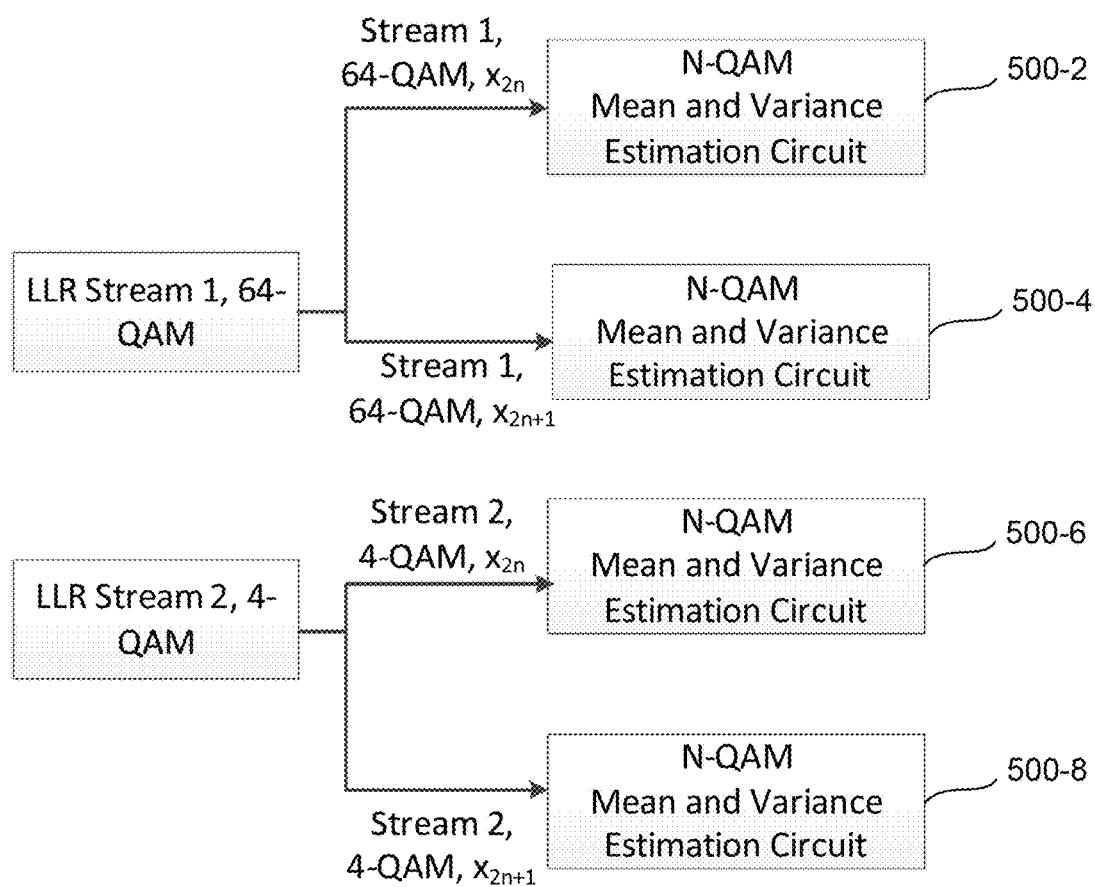
FIG. 6 is a block diagram describing an example of processing data streams of different QAM orders using multiple N-QAM mean and variance estimation circuits.

FIG. 6 shows a simplified example using generalized estimation circuits capable of generating mean and variance estimations for all potential QAM formats. In FIG. 6, an example is shown where four generalized estimation circuits are provided. Rather than utilize complex routing, the control unit may simply provide data streams to any one of the available generalized estimation circuits. The data streams are provided with an indication of their QAM format that is utilized by the estimation circuit for its output controls.

An example is shown in FIG. 6 where two data streams are received. The first data stream is in a 64-QAM format and the second data stream is in a 4-QAM format. For the second data stream utilizing the 4-QAM format, two estimation circuits 500-6 and 500-8 are allocated and for the first data stream in the 64-QAM format, two estimation circuits 500-2 and 500-4 are allocated. The control unit provides the first data stream to the corresponding estimation circuits along with an indicator of the 64-QAM format and provides the second data stream to the corresponding estimation circuits along with an indicator for the 4-QAM format.

Figure 7:
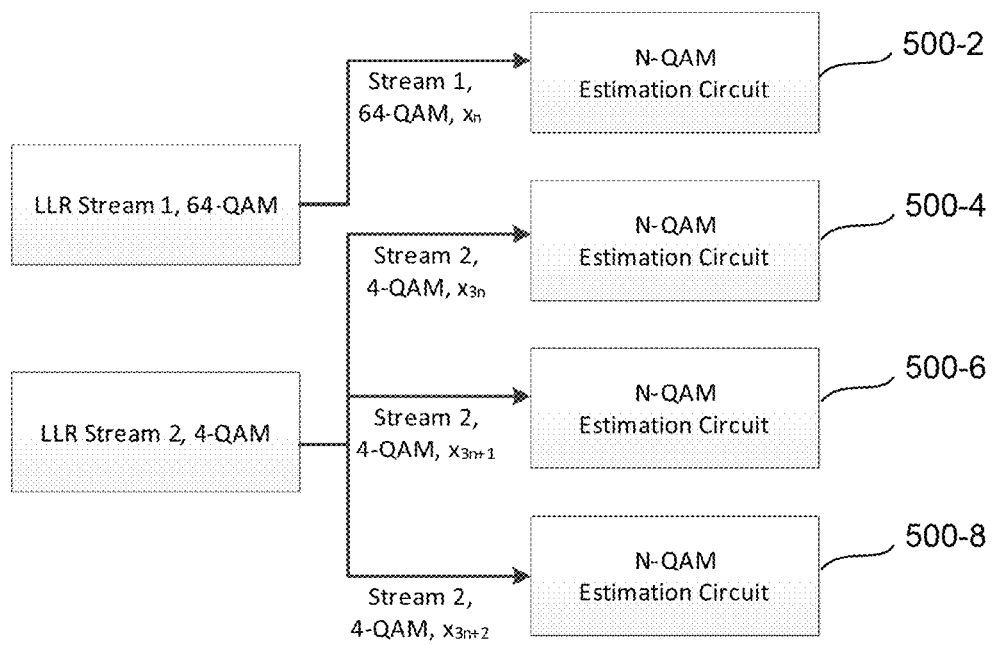
FIG. 7 is a block diagram describing an example of processing data streams of different QAM orders and different block lengths using multiple N-QAM mean and variance estimation circuits.

In many instances, data streams will utilize different block lengths. To achieve the same processing delay for each data stream when the data streams utilize different block lengths, the control unit may allocate different numbers of estimation circuits for different data streams. FIG. 7 depicts an example where the first data stream has a first block length and the second data stream has a second block length, different from the first. In the particular example, the second block length for the 4-QAM data stream is three times the size of the first block length for the 64-QAM data stream. The control unit allocates three estimation circuits 500-4, 500-6, 500-8 for the second data stream and one estimation circuit 500-2 for the first data stream. This flexibility allows a consistent processing delay for data streams of different block lengths. The allocation may also be based or considered with the processing delay of other units, such as a detection unit, decoder cores, when parallel processes are considered.

Figure 8:
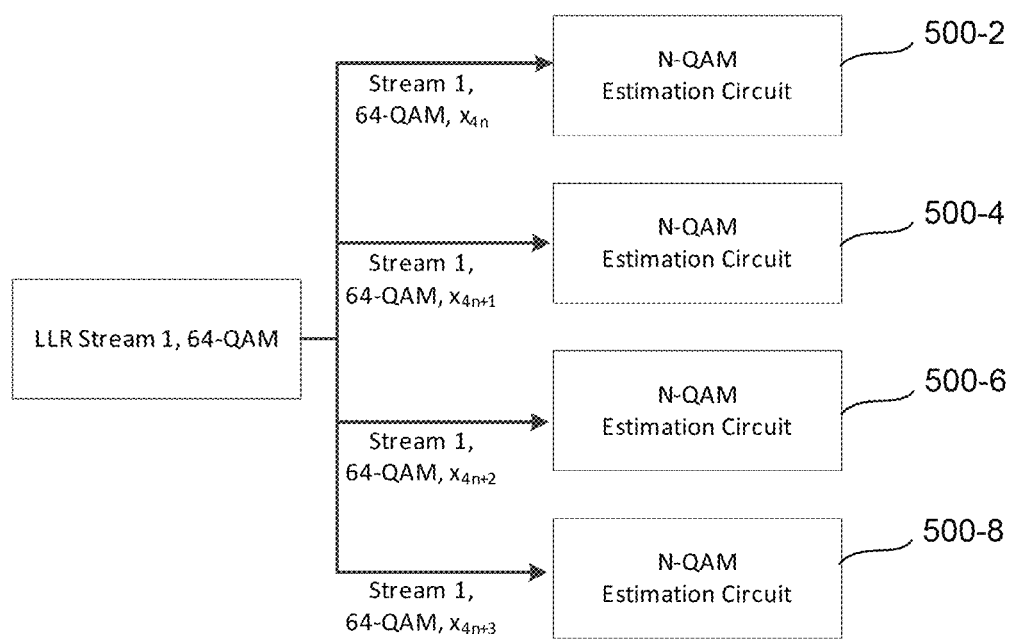
FIG. 8 is a block diagram describing an example of processing a single data stream using multiple N-QAM mean and variance estimation circuits.

The flexibility of a generalized N-QAM estimation circuit architecture is further illustrated in FIG. 8. In FIG. 8, a single 64-QAM data stream is received. The control unit allocates all of the available N-QAM estimation circuits 500-2, 500-4, 500-6, and 500-8 to the single data stream. Accordingly, the data stream is divided and processed in parallel by four estimation circuits.

It is noted that the multiple data streams processed together with the estimation circuits are not necessarily to be co-scheduled on the same time-frequency resources. As long as the multiple data streams are scheduled in the same time slots, a base station may finish processing them with the same delay constraints. Therefore, the generalized N-QAM estimation circuits can be utilized with maximum parallelism. This can be achieved with simpler logistics, greater flexibility, and less circuitry via the disclosed methods and architectures.

Figure 9:
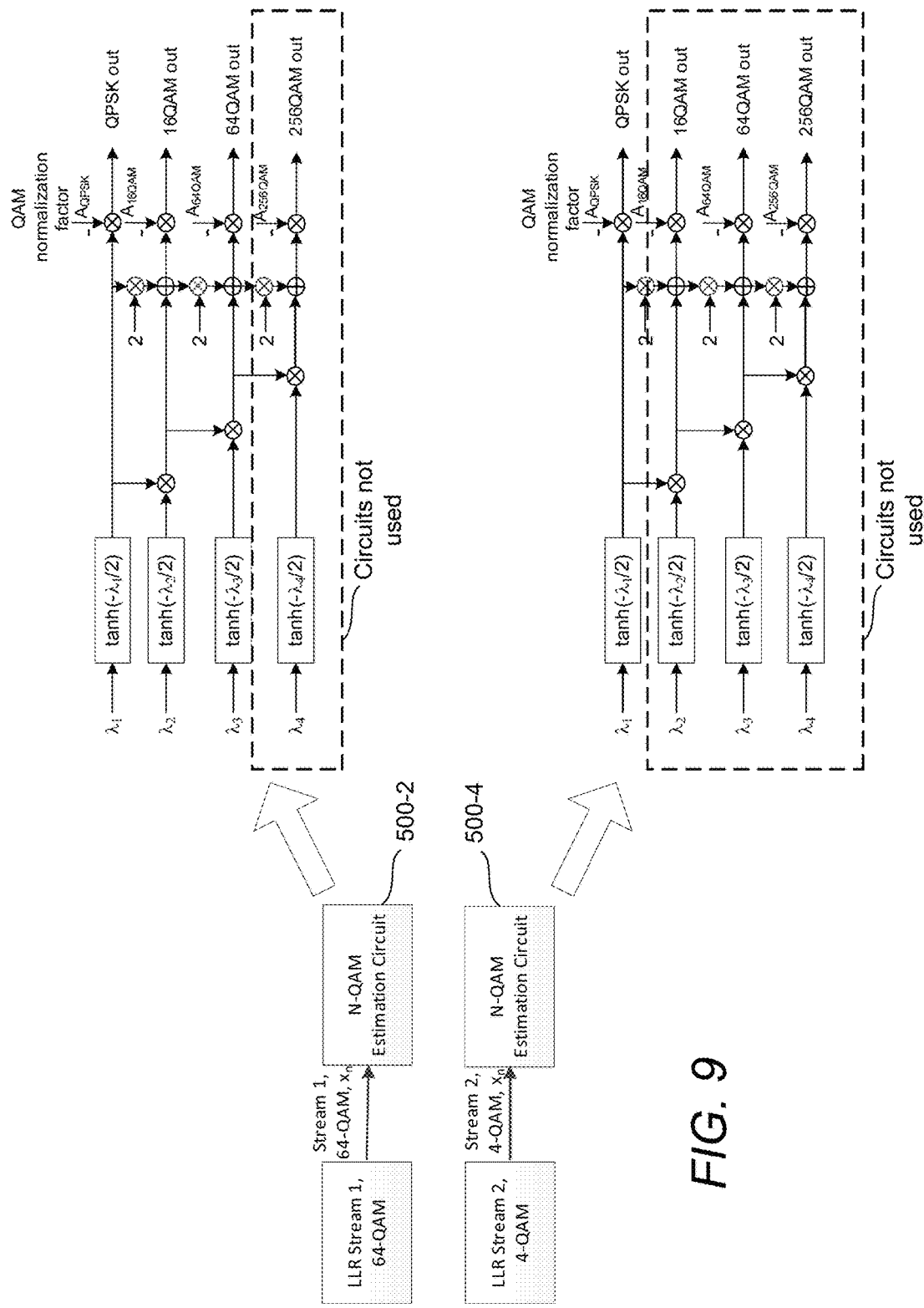
FIG. 9 is a block diagram showing circuit usage within N-QAM mean and variance estimation circuits when processing data streams of different QAM orders.

FIG. 9 is a schematic and block diagram depicting an example of two generalized N-QAM estimation circuits configured for processing two input data streams. In this example, the first input data stream is a 64-QAM signal and the second input data stream is a QPSK (4-QAM) data stream. A first N-QAM estimation circuit is allocated for processing the first data stream and a second N-QAM estimation circuit is allocated for processing the second 4-QAM data stream.

In this example, each N-QAM estimation circuit includes mean estimation circuitry to accommodate a highest QAM-order of 256-QAM as shown in FIG. 3. With a 256-QAM capability, the two data streams may be processed in parallel by the two N-QAM estimation circuits.

FIG. 9 further depicts the utilization of the N-QAM circuitry when processing the 64-QAM data stream and the 4-QAM data stream. When processing the first data stream at a 64-QAM order, the N-QAM mean estimation circuit utilizes three of the four circuit stages provided for processing the input data stream. Accordingly, one branch or stage of circuitry, specifically the branch for 256-QAM processing is not used when processing the 64-QAM data stream. The circuitry forming the 256-QAM branch remains idle, representing a potential inefficient use of the available hardware during processing of certain order data streams.

When processing the second data stream at a 4-QAM (QPSK) order, the N-QAM estimation circuit utilizes one of the four circuit stages provided for processing the input data stream. Accordingly, three branch or stages of circuitry, specifically the branches for 16-QAM, 64-QAM, and 256-

QAM processing are not used when processing the 4-QAM data stream. The circuitry forming the 16-QAM, 64-QAM, and 256-QAM branches remains idle, representing a further potential inefficient use of the available hardware during processing of certain order data streams.

In accordance with one embodiment, an estimation unit (EU) circuit is provided that is configured for mean and/or second moment estimations for QAM symbols. An estimation unit EU circuit may include a unitized mean estimation (MEU) circuit and/or a unitized second moment estimation (SEU) circuit. The MEU and SEU circuits are adaptive to different QAM orders or formats. Each circuit is configured to receive a variable QAM normalization factor so that the circuit can process data streams of different QAM orders. The variable QAM normalization factor is selected based on a counter value associated with a number of iterations for a mean or variance estimation. The MEU circuit generates a signal including a representation of a mean estimation for a QAM data stream. The SEU circuit generates a signal including a representation of a second moment estimation for a QAM data stream.

Each estimation unit EU circuit is a disassembled and unitized circuit that is configurable for processing multiple orders of QAM data streams. Multiple EU circuits are provided with a control unit capable of configuring and reconfiguring the EU circuits for sequential and/or parallel processing. This enables the EU circuits to be configured individually and/or in combination with other EU circuits to provide processing for a necessary QAM order, as well as to achieve processing goals for data streams of different block lengths and priorities.

Figure 10:
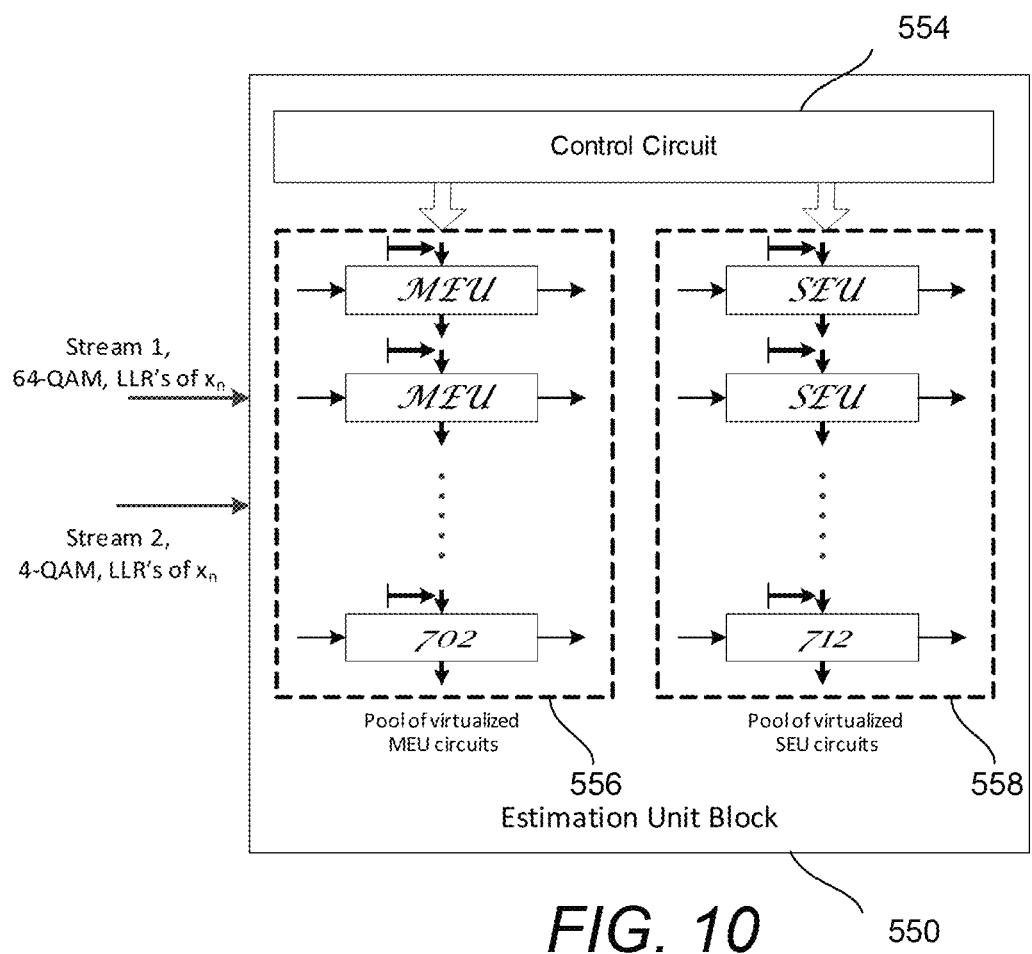
FIG. 10 is a block diagram of an estimation unit block in one embodiment including pools of virtualized estimation unit circuits.

FIG. 10 is a block diagram of one embodiment of a virtualized estimation unit block 550 including a pool of virtualized MEU circuits 702 and SEU circuits 712. The unit block 550 may be implemented within signal processor 60 in one embodiment. In other embodiment, a portion or all of unit block 550 may be implemented elsewhere within the transceiver circuitry. Multiple virtualized mean estimation unit (MEU) circuits are grouped together in a pool of virtualized MEU circuits 556. Each MEU circuit is configured as shown in FIGS. 11A-11Dc in one embodiment. Each MEU circuit includes a plurality of inputs for receiving Xi, Eta, and counter values as well as a stream of LLR values. Each MEU circuit includes a plurality of outputs for providing output Xi, Eta, and counter values and a 1-D mean estimation value for a $2^{2Q}$-QAM. The counter may be implemented outside of the MEU circuit in one embodiment such that the inputs and outputs do not include counter values. The MEU circuits may be configured for sequential and/or parallel processing.

Multiple virtualized second moment estimation unit SEU circuits are grouped together in a pool of virtualized SEU circuits. Each SEU circuit is configured as shown in FIGS. 14a-14c or 15a-15c in one embodiment. Each SEU circuit includes a plurality of inputs for receiving Xi, Eta, and counter values as well as a stream of LLR values. Each circuit includes a plurality of outputs for providing output Xi, Eta, and counter values and a 1-D mean estimation value for a $2^{2Q}$-QAM. As earlier described, the counter may be implemented outside of the SEU circuit in one embodiment such that the inputs and outputs do not include counter values. In another embodiment, the SEU circuit may additionally include a QAM format dependent scalar value Cin. The SEU circuit may be configured for sequential and/or parallel processing.

The pool of virtualized MEU circuits and the pool of virtualized SEU circuits are configured by a control circuit 554 that operates the pools for processing input data streams. The control unit connects the LLR inputs to the individual circuits as needed for QAM processing of an input data stream. The control unit samples the output of one or more circuits at the appropriate location and at the appropriate rate for a particular QAM format. In one embodiment, the maximum capacity including processing estimates per unit processing time can be obtained and provided to an outside task scheduler. The outside task scheduler then sends one or more data streams at a certain data rate which are processed appropriately by the estimation block. The control unit may include a microcontroller, microprocessor, digital signal processor, or other circuitry configured to control the EU circuits as described.

Figure 11A:
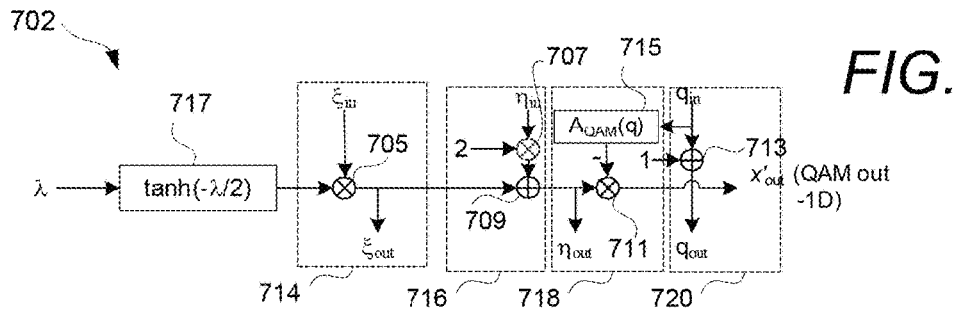
FIG. 11A is a schematic diagram of a mean estimation unit circuit in one embodiment.

FIG. 11A is a schematic diagram of an EU circuit including a unitized mean estimation unit circuit (MEU) for generating signals representing a mean estimation for QAM processing in accordance with an embodiment of the present disclosure. The MEU circuit includes a plurality of inputs $\xi_{in}$, $\eta_{in}$, and $q_{in}$, and a plurality of outputs $\xi_{out}$, $\eta_{out}$, and $q_{out}$.

The MEU circuit includes an input for receiving a data stream of input λ LLR values and an output $x_{out}$ that provides an output signal including a representation of mean estimation values x. The output is a generalized QAM output in a single dimension (1D). This can be contrasted with the circuit implementation illustrated in FIG. 3 where four inputs are provided to receive LLR values and four outputs are provided to generate a mean estimation for four different QAM orders.

The MEU circuit includes input $\xi_{in}$ to receive an input Xi value, input $\eta_{in}$ to receive an input Eta value, and input $q_{in}$ to receive an input counter value. The MEU circuit includes output $\xi_{out}$ to provide an output Xi value, an output $\eta_{out}$ to provide an output Eta value, and an output $q_{out}$ to provide an output counter value. The MEU circuit implements the following functions to generate the outputs $\xi_{out}$, $\eta_{out}$, $q_{out}$, including the mean estimation output $\tilde{x}_{out}$:

$$\xi_{out} = \xi_{in} \cdot \tanh(-\lambda/2),$$

$$\eta_{out} = 2\eta_{in} + \xi_{out},$$

$$q_{out} = q_{in} + 1,$$

$$\tilde{x}_{out} = A_{QAM}(q_{in}) \cdot \eta_{out},$$

$A_{QAM}(q)$ is the QAM normalization factor given by Equation 14 for N-QAM (N=$2^{2q}$):

$$A_{QAM}(q) = \frac{1}{\sqrt{E_N}} = \frac{1}{\sqrt{\frac{2}{3}(2^{2q}-1)}} \qquad \text{Equation 14}$$

In one embodiment, the value of $A_{QAM}(q)$ can be pre-stored in the mean estimation circuit. The value of $A_{QAM}(q)$ can be stored in non-volatile or other memory 715 as a plurality of QAM normalization factor values dependent on an input $q_{in}$ counter value. The input and output implement a counter, receiving an input $q_{in}$ counter value and generating an output $q_{out}$ counter value. By including $q_{in}$ and $q_{out}$, the MEU circuit provides a counter for utilization by the MEU circuit, and also for the automatic selection of the normalization factor $A_{QAM}(q)$. Alternatively, the counter can be implemented outside of the MEU circuit. In such a case, the input $A_{QAM}(q)$ can be provided to the MEU circuit as an input in place of $q_{in}$ for use in processing after the outside selection based on the counter value. Thus, the MEU circuit can receive the normalization factor from an internal memory of the MEU circuit or as an input normalization factor value provided to the MEU circuit.

The estimation unit circuit includes a tanh( ) generating circuit 717 having a first input terminal configured to receive an input $\lambda$. The tanh( ) generating circuit is configured to produce a corresponding output tanh(-$\lambda$/2) signal for the input $\lambda$ value.

The estimation unit circuit includes an Xi circuit component 714 configured to receive the input $\xi_{in}$ value at a first input and the output tanh(-$\lambda$/2) value of the hyperbolic tangent function circuit at a second input. The Xi circuit component generates the output $\xi_{out}$ value by combining the input $\xi_{in}$ value and the output tanh(-$\lambda$/2) value. In the example of FIG. 11A, the Xi circuit component includes a multiplier 705 having a first input terminal that receives the input $\xi_{in}$ value and a second input terminal that receives the output tanh(-$\lambda$/2) value of the hyperbolic tangent function circuit 717. The output $\xi_{out}$ value of the multiplier 705 is provided as output of the estimation unit circuit and as an input to an Eta circuit component.

The estimation unit circuit includes an Eta circuit component 716 configured to receive the input $\eta_{in}$ value and the output $\xi_{out}$ value. The Eta circuit component generates the output $\eta_{out}$ value. In the example of FIG. 11A, the Eta circuit component includes a multiplier 707 that receives the input $\eta_{in}$ value and generates an updated $\eta$ value. Multiplier 707 also receives an input multiply by 2 to generate a left shifted (by one bit) and zero padded version of the input Eta values $\eta_{in}$. This function can be performed with a minimized circuit that shifts its received bits by one bit place and inserts a padding zero bit at the least significant bit location (LSB) of its output.

The updated $\eta$ value is provided to an input of an adder 709. The adder 709 also receives the output $\xi_{out}$ value. The updated $\eta$ values and the output $\xi_{out}$ value are combined to generate the output $\eta_{out}$ value. The output $\eta_{out}$ value of the multiplier is provided as output 716 of the estimation unit circuit and as an input to a normalization circuit component.

The MEU circuit includes a normalization circuit component 718 configured to receive a negatively signed input $A_{QAM}(q)$ value and the output $\eta_{out}$ value. The normalization circuit component generates the output mean estimation $x_{out}$ value. In the example of FIG. 11A, the normalization circuit component includes a multiplier 711 that receives the negatively signed input normalization factor value $A_{QAM}(q)$ and the output Eta value $\eta_{out}$ and generates the mean estimation output $x_{out}$ value.

The MEU circuit includes a counter circuit component 720 configured to receive an input counter value $q_{in}$ and generate an output counter value $q_{out}$. In the example of FIG. 11a, the counter circuit component includes an adder 713 that receives the input counter value $q_{in}$ and an increment value (e.g., 1) and generates the output counter $q_{out}$ value.

In one embodiment, the MEU circuit does not receive an input counter value $q_{in}$. Instead, the MEU circuit receives a normalization factor value $A_{QAM}(q)$ that is determined by external circuitry. An external circuit can determine the normalization factor based on a counter value and generate the normalization factor value $A_{QAM}(q)$ which is then provided to the MEU circuit.

The architecture in FIG. 11A includes the function tanh(-$\lambda$/2). Since the tanh(-$\lambda$/2) function might be needed for both a mean and a variance estimation, or somewhere else, it may be taken out of the EU circuit in one embodiment. In such a case, the input can be the value of tanh(-$\lambda$/2) instead of $\lambda$. Such alternative implementation of the unit circuit is shown in FIG. 11B.

Figure 11B:
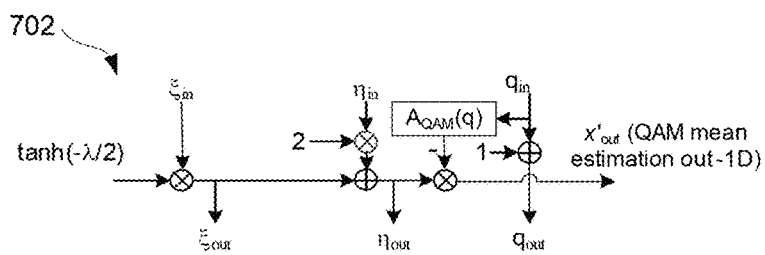
FIG. 11B is a schematic diagram of a mean estimation unit circuit in one embodiment.
Figure 11C:
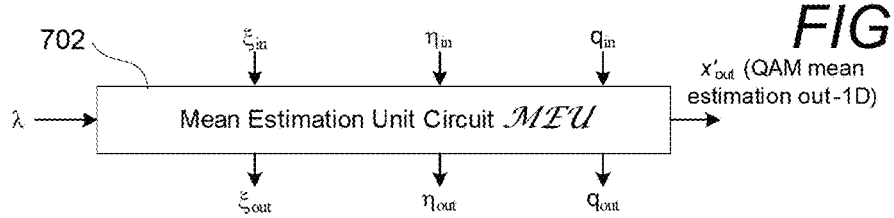
FIG. 11C is a block diagram of a virtualized mean estimation unit circuit in one embodiment.

The MEU circuit in FIG. 11A or 11B can be put to a virtualized MEU circuit with the LLR related input being $\lambda$ or tanh(-$\lambda$/2) depending on the architecture used. FIG. 11C is a block diagram describing virtualization of the unitized mean estimation MEU circuit of FIG. 11A or FIG. 11B. As shown by the block diagram, the virtualized MEU circuit receives input signals including, $\xi_{in}$, $\eta_{in}$, $q_{in}$, and $\lambda$ values. If the related input to the MEU circuit is tanh(-$\lambda$/2), the virtualized unit circuit will have an input that receives tanh(-$\lambda$/2) in place of $\lambda$.

The MEU circuit generates output signals including $\xi_{out}$, $\eta_{out}$, $q_{out}$, and $\tilde{x}_{out}$ values. The functions provided by the various circuit components are abstracted and can be viewed together as the virtualized circuitry. As earlier described, the individual MEU circuits can be configured for sequential and/or parallel processing to provide processing of input data streams having different QAM orders, block lengths, and/or priorities.

Figure 11D:
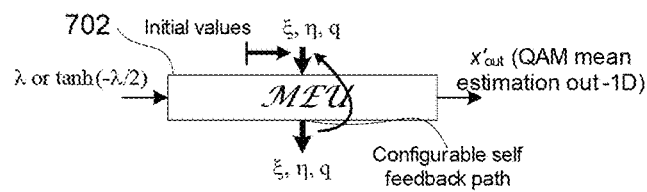
FIG. 11D is a block diagram of a virtualized mean estimation unit circuit in one embodiment including a configurable self feedback path.

FIG. 11D is a block diagram depicting a further abstracted view of one embodiment of a virtualized MEU circuit. The set of inputs, $\xi_{in}$, $\eta_{in}$, $q_{in}$ for receiving input Xi, Eta, and counter values are shown collectively as an input and the set of outputs $\xi_{out}$, $\eta_{out}$, and $q_{iout}$ for providing corresponding output values are shown collecting as a single input. The outputs provide a configurable self feedback path. Control circuit 554 may connect the outputs of a single MEU circuit to its inputs to provide sequential processing in one embodiment. Control circuit 554 may alternatively provide the set of outputs from one MEU circuit to a subsequent MEU circuit in the pool of circuits to provide parallel processing in one embodiment. The MEU circuit includes an input to receive a stream of $\lambda$ or tanh(-$\lambda$/2) values. The MEU circuit includes an output that provides a signal including a representation of a mean estimation output $\tilde{x}_{out}$.

Figure 12:
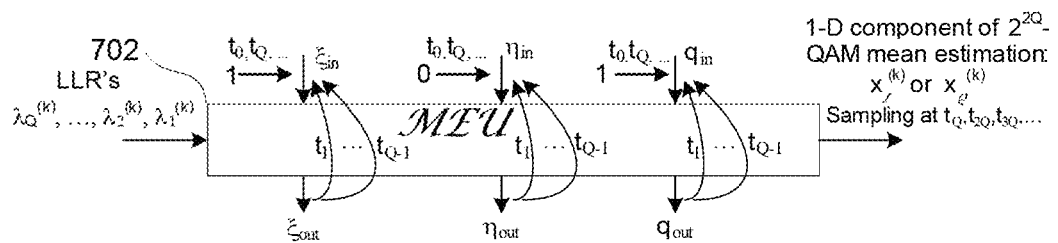
FIG. 12 is a block diagram of a virtualized mean estimation unit circuit in one embodiment depicting sequential processing.

FIG. 12 is a block diagram of one embodiment of a virtualized MEU circuit, describing an example of sequential processing to compute one dimension of a QAM mean estimation. FIG. 12 depicts the inputs $\xi_{in}$, $\eta_{in}$, and $q_{in}$, which receive corresponding Xi, Eta, and counter values for each unit processing time shown as $t_1, t_2, \ldots t_{Q-1}$. The three outputs $\xi_{out}$, $\eta_{out}$, $q_{out}$ provide output values including corresponding representations of the Xi, Eta, and counter values for each unit processing time beginning at $t_1$, $t_2$, $t_3$ . . . . In this example, the input values of $\xi_{in}$, $\eta_{in}$, and, $q_{in}$ are initialized to the values 1, 0, and 1, respectively, at times $t_0$, $t_Q$, $t2Q$ . . . . The LLR values for one data stream are sequentially sent as the $\lambda$ input, given as, $\lambda_1^{(k)}, \ldots, \lambda_Q^{(k)}$ for a $2^{2Q}$-QAM.

For the three outputs $\xi_{out}$, $\eta_{out}$, $q_{out}$, the MEU circuit generates output signals including corresponding representations of the Xi, Eta, and counter values for each unit processing time beginning at $t_1$, $t_2$, $t_3$. For sequential processing, the three outputs $\xi_{out}$, $\eta_{out}$, $q_{out}$ are configured to be provided to the three inputs, $\xi_{in}$, $\eta_{in}$, and $q_{in}$ after running the MEU circuit for each unit processing time $t_1, t_2, \ldots t_{Q-1}$.

The MEU circuit generates for the output $\tilde{x}_{out}$ an output signal including a representation of the mean estimation. After processing the circuit every Q times, the estimation output $\tilde{x}_{out}$ is sampled as the resulting 1-D mean estimation.

The values $\xi_{in}$, $\eta_{in}$, and $q_{in}$ are reset with the initial values after the MEU circuit iterates Q times, at times $t_0$, $t_Q$, $t_{2Q}$, . . . . The mean estimation values are obtained by sampling the estimation output $\tilde{x}_{out}$ at times $t_0$, $t_Q$, $t_{2Q}$, . . . .

Figure 13:
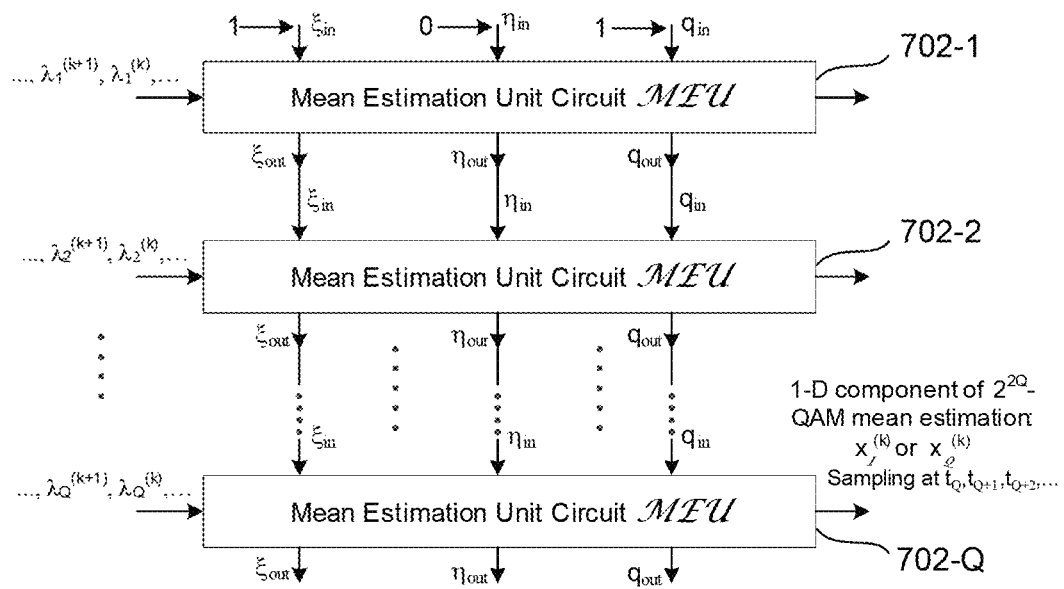
FIG. 13 is a block diagram of multiple virtualized mean estimation unit circuits in one embodiment depicting parallel processing.

FIG. 13 is a block diagram of one embodiment of multiple virtualized MEU circuits, describing an example of parallel processing to compute one dimension of a QAM mean estimation. For a 1-D mean estimation for a $2^{2Q}$-QAM signal, a number of circuits equal to Q can be parallel connected, with the outputs $\xi_{out}$, $\eta_{out}$, $q_{out}$ of a subset of the circuits connected to the inputs $\xi_{in}$, $\eta_{in}$, and $q_{in}$ of the subsequent MEU circuit in the chain. For the last circuit of the chain, the outputs can be sampled at the appropriate intervals as needed.

For the first circuit, the inputs $\xi_{in}$, $\eta_{in}$, and $q_{in}$ are set to the initial values 1, 0, and 1, respectively. The LLR inputs $\lambda_1, \lambda_2, \ldots, \lambda_Q$ are routed to corresponding ones of the parallel-connected circuits. Because one MEU circuit takes the output of the previous MEU circuit in the chain, there is an initial delay while the MEU circuits await the previous MEU circuits to process. After Q processing time units, the mean estimate can be obtained by sampling the estimation output $x_{out}$ at time $t_Q$ for the last MEU circuit 702-Q in the chain. However, because each MEU circuit can take the output of the previous MEU circuit immediately, an estimate can be generated at the Q-th MEU circuit at each processing time unit $t_{Q+1}$, $t_{Q+2}$ after the initial Q processing time units. Therefore, parallel processing may be Q times faster than sequential processing with one MEU circuit. However, if sequential processing on Q MEU circuits, the processing throughput will be the same.

Although discrete examples of sequential and parallel processing are shown, one embodiment includes configuring a pool of MEU circuits for a combination of sequential processing and parallel processing. A portion of a data stream may be processed sequentially by one or more MEU circuits and another portion of a data stream may be processed in parallel by two or more MEU circuits.

Figure 14A:
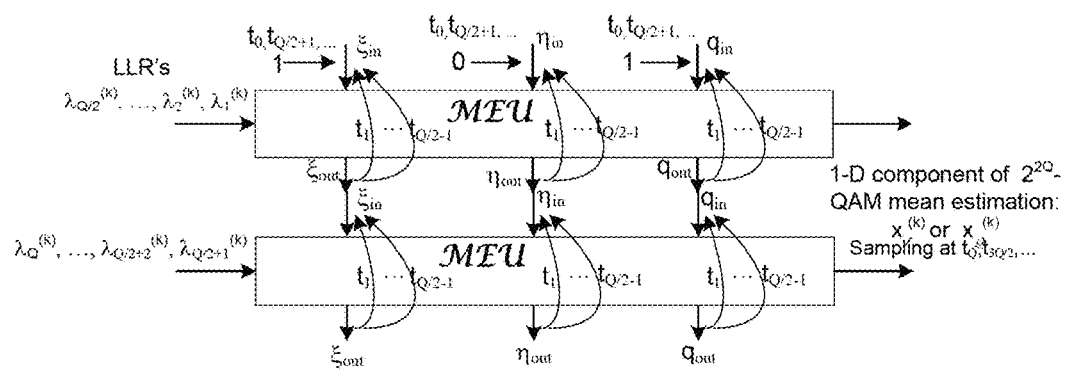
FIG. 14A is a block diagram of multiple virtualized mean estimation unit circuits depicting hybrid parallel/sequential processing in one example.
Figure 14B:
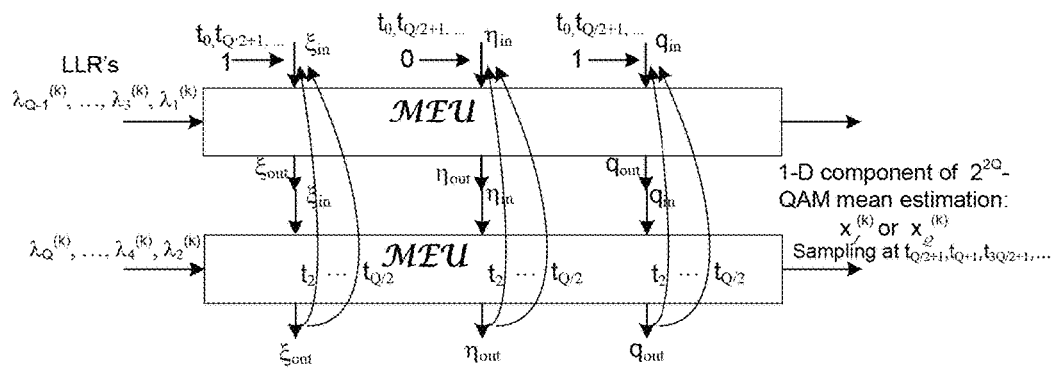
FIG. 14B is a block diagram of multiple virtualized mean estimation unit circuits depicting hybrid parallel/sequential processing in one example.

Multiple MEU circuits can also be configured for hybrid sequential and parallel processing for processing one data stream. FIGS. 14A and 14B provide examples of hybrid processing with a mixture of sequential and parallel processing. FIG. 14A shows one exemplary embodiment that includes outer parallel processing of two mean estimation unit circuits with each configured with inner sequential processing of Q/2 processing time units. As shown in FIG. 14A, the inputs such as Xi, Eta, and/or counter values can first be initialized and the outputs of a subset of circuits then provided as the inputs to the circuits themselves for processing a number of times as the inner loop sequential processing before passing the outputs to the inputs of a subsequent circuit for another the inner loop sequential processing. Thus the outer is parallel processing. For $2^{2Q}$-QAM, assuming that Q is even, each MEU circuit is sequentially processed for Q/2 times. The mean estimation values are obtained by sampling the output at the second MEU circuit at $t_Q$, $t_{3Q/2}$, $t_{2Q}$, . . . .

FIG. 14B shows one exemplary embodiment that includes outer sequential processing over two mean estimation unit circuits configured with inner parallel processing. In FIG. 14B, the inputs such as Xi, Eta, and/or counter values can first be initialized and the outputs of the first circuits in the chain provided to the inputs of a subsequent circuit in the chain, which forms inner parallel processing. The outputs of the second circuit in the chain can be configured as the inputs to the first circuits in the chain, forming the outer sequential processing. For $2^{2Q}$-QAM, assuming that Q is even, the inner parallel processing with two MEU circuits process two LLR inputs each time. With outer Q/2 times sequential processing of two inner parallel processing, mean estimation values are obtained by sampling the output at the second MEU circuit at $t_{Q/2+1}$, $t_{Q+1}$, $t_{3Q/2+1}$, . . . .

Figure 15A:
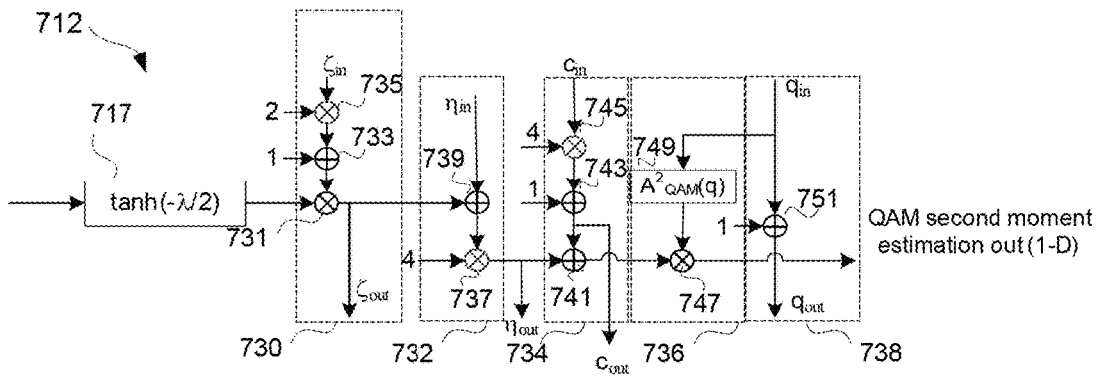
FIG. 15A is a schematic diagram of a second moment estimation unit circuit in one embodiment.

FIG. 15A is a schematic and block diagram of a unitized estimation circuit for generating signals including a representation of a second moment estimation for QAM processing in accordance with an embodiment of the disclosure. The second moment estimation unit SEU circuit 712 includes a plurality of inputs inputs $\xi_{in}$, $\eta_{in}$, $c_{in}$, and $q_{in}$, and a plurality of outputs $\xi_{out}$, $\eta_{out}$, $c_{out}$, $q_{out}$.

The SEU circuit includes an input for receiving a data stream of LLR values $\lambda$ and an output $\tilde{v}_{out}^2$ for providing an output signal including a representation of a second moment estimation $\tilde{v}_{out}^2$ values. The output is a generalized QAM output in a single dimension (1D).

The SEU circuit includes additional inputs including input $\xi_{in}$ to receive an input $\xi$ value, input $\eta_{in}$ to receive an input $\eta$ value, input $c_{in}$ to receive an input c value, and input $q_{in}$ to receive an input q value. The SEU circuit includes an output $\xi_{out}$ to provide an output $\xi$ value, an output $\eta_{out}$ to provide an output $\eta$ value, an output $c_{out}$ to provide an output c value, and output $q_{out}$ to provide an output q value. The SEU circuit implements the following functions to generate the outputs $\xi_{out}$, $\eta_{out}$, $c_{out}$, $q_{out}$, including the second moment estimation output $\tilde{v}_{out}^2$:

$$\xi_{out}=(2\xi_{in}+1)\cdot\tan h(-\lambda/2),$$

$$\eta_{out}=4(\eta_{in}+\xi_{out}),$$

$$c_{out}=4c_{in}+1$$

$$q_{out}=q_{in}+1,$$

$$\tilde{v}_{out}^2=A_{QAM}^2(q_{in})\cdot(\eta_{out}+c_{out}),$$

The estimation unit circuit includes a tanh( ) generating circuit 717 having a first input terminal configured to receive an input $\lambda$ value. The tanh( ) generating circuit is configured to produce a corresponding output tanh($-\lambda/2$) signal for the input $\lambda$ value.

The estimation unit circuit includes an Xi circuit component 730 configured to receive the input $\xi_{in}$ value at a first input and the output tanh($-\lambda/2$) value of the hyperbolic tangent function circuit at a second input. The Xi circuit component includes a multiplier 735 that receives the input $\xi_{in}$ value and generates an updated $\xi$ value. The multiplier implements a multiply by 2 to generate a left shifted (by one bit) and zero padded version of the input $\xi_{in}$ value. The updated $\xi$ value is provided to an adder 733 which generates an increased $\xi$ value. The increased $\xi$ value and the output tanh($-\lambda/2$) of the hyperbolic tangent function circuit are combined by multiplier 731 to generate the output $\xi_{out}$ value. The output $\xi_{out}$ value of the multiplier 705 is provided as output of the estimation unit circuit and as an input to an Eta circuit component.

The estimation unit circuit includes an Eta circuit component 732 configured to receive the input $\eta_{in}$ value and the output $\xi_{out}$ value. The Eta circuit component generates the output $\eta_{out}$ value. In the example of FIG. 15A, the Eta circuit component includes an adder 739 that receives an input $\eta_{in}$ value and generates an updated $\eta$ value. The updated $\eta$ value is provided to a multiplier 737 which also receives an input multiply by 4 to generate a left shifted (by two bits) and zero padded version of the updated $\eta$ value. The multiplier generates the output $\eta_{out}$ value.

In one embodiment, the SEU circuit receives an input scalar $C_{in}$ value that is determined by external circuitry as shown in FIG. 15A. External circuits can determine the scalar value based on a counter value and generate the input scalar $C_{in}$ value which is then provided to the SEU circuit at scalar component 734. In this example, the input scalar $C_{in}$ value is provided to a multiplier 745 which implements a multiply by 4 to generate a left shifted (by two bits) and zero padded version of the input scalar $C_{in}$ value. The updated scalar value is provided to an adder 743 which generates an increased scalar C value by adding by one. In this case, the output of the adder 743 is provided as an output $C_{out}$ of the SEU circuit. The output $C_{out}$ is also provided to adder 741 which also receives the output $\eta_{out}$ value. The two values are combined by the adder and provided to multiplier 747 that forms part of the normalization circuit component 736.

The normalization circuit component 736 is configured to receive an input $A_{QAM}^2(q_{in})$ value and the output of adder 741 of the scalar circuit component. The normalization circuit component includes a multiplier 747 that receives the inputs and generates the second moment estimation output $\tilde{v}_{out}^2$ value.

In one embodiment, the value of $A_{QAM}^2(q_{in})$ can be pre-stored in the mean estimation circuit. The value of $A_{QAM}^2(q_{in})$ can be stored in non-volatile or other memory 749 as a plurality of QAM normalization factor values dependent on an input counter value $q_{in}$. The input and output implement a counter, receiving an input counter $q_{in}$ value and generating and output counter $q_{out}$ value. Alternatively, the counter can be implemented outside of the estimation unit circuit. In such a case, the input $A_{QAM}^2(q_{in})$ can be provided to the MEU circuit as an input in place of $q_{in}$ for use in processing after the outside selection based on the counter value. Thus, the MEU circuit can receive the normalization factor from an internal memory of the MEU circuit or as an input normalization factor value provided to the MEU circuit The estimation unit circuit includes a counter circuit component 738 configured to receive an input counter value $q_{in}$ and generate an output counter value $q_{out}$. In the example of FIG. 15A, the counter circuit component includes an adder 751 that receives the input counter value $q_{in}$ and an increment value (e.g., 1) and generates the output counter $q_{out}$ value.

The architecture in FIG. 15A includes the function tanh($-\lambda/2$). Since the tanh($-\lambda/2$) function might be needed for both mean and variance estimations, or somewhere else, it may be taken out of the unit circuit. Then the input will be the value of tanh($-\lambda/2$) instead of $\lambda$. Such alternative implementation of the unit circuit is shown in FIG. 15B.

Figure 15B:
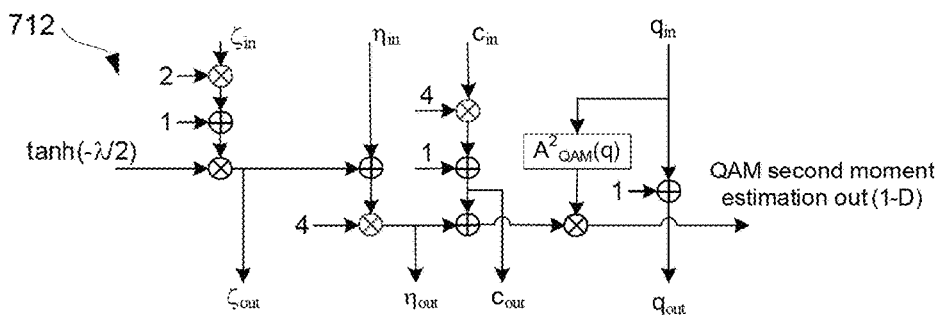
FIG. 15B is a schematic diagram of a second moment estimation unit circuit in one embodiment.
Figure 15C:
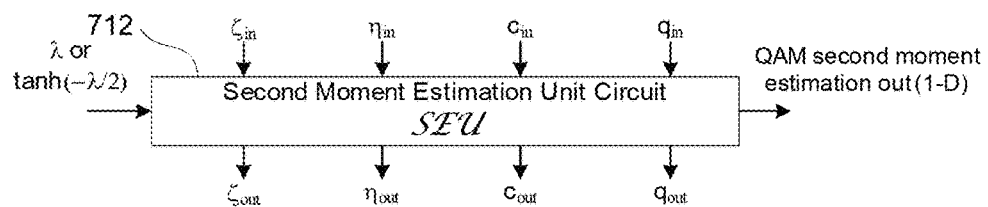
FIG. 15C is a block diagram of a virtualized second moment estimation unit circuit in one embodiment.

FIG. 15C is a block diagram describing virtualization of the variance estimation unit circuit of FIG. 14A. As shown by the block diagram, the virtualized MEU circuit includes five inputs 750, 752, 754, 756, and 758 to receive input signals $\lambda$, $\xi_{in}$, $\eta_{in}$, $C_{in}$, and $q_{in}$ and four outputs 772, 774, 776, and 778 to provide output signals $\tilde{v}_{out}^2$, $\xi_{out}$, $\eta_{out}$, $C_{out}$ and $q_{out}$. The functions provided by the various circuit components are abstracted and can be viewed together as the virtualized circuitry. As earlier described, the individual SEU circuits can be configured for sequential and/or parallel processing to provide processing of input data streams having different QAM orders, block lengths, and/or priorities.

The SEU circuit in FIG. 15A or 15B can be put to a virtualized SEU circuit as shown in FIG. 15C with the LLR related input being $\lambda$ or tanh($-\lambda/2$) depending on the architecture used in FIG. 15A or 15B. If the related input to the SEU circuit is tanh($-\lambda/2$), the virtualized unit circuit will have an input that receives tanh($-\lambda/2$) in place of $\lambda$.

Figure 16A:
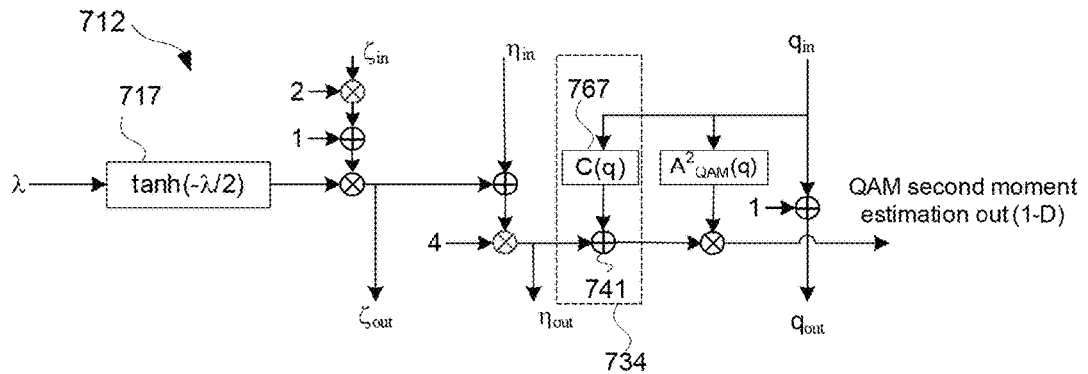
FIG. 16A is a schematic diagram of a second moment estimation unit circuit in one embodiment.

FIG. 16A depicts one embodiment where the SEU circuit determines an input scalar value $C_q$ by circuitry within the SEU circuit. The value of $C_q$ can be stored in non-volatile or other memory 767 as a plurality of format dependent scalar values dependent on an input counter value $q_{in}$.

The estimation circuit includes a scalar circuit component 734 configured to receive the input counter value $q_{in}$ and generate a QAM format dependent scalar input $C_q$ value. The value of $C_q$ can be stored in non-volatile or other memory 767 as a plurality of format dependent scalar values dependent on the input counter value $q_{in}$. The scalar circuit component includes an adder 741 that receives the input $C_q$ value and the output $\eta_{out}$ value. The adder generates an updated scalar value C which is provided to the normalization circuit component.

Figure 16B:
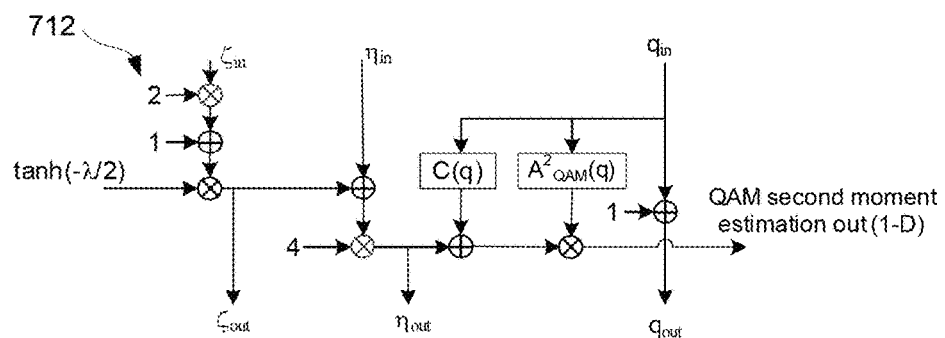
FIG. 16B is a schematic diagram of a second moment estimation unit circuit in one embodiment.

FIG. 15B shows a variation to the embodiment of FIG. 16B in which the tanh($-\lambda/2$) function circuit 717 is removed. The value of tanh($-\lambda/2$) can be computed by external circuitry and provided to the SEU circuit as shown.

Figure 16C:
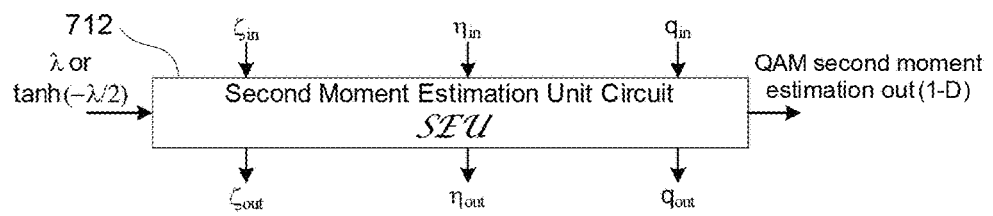
FIG. 16C is a block diagram of a virtualized second moment estimation unit circuit in one embodiment.

FIG. 16C is a block diagram describing virtualization of the variance estimation unit circuit of FIG. 16A or 16B. As shown by the block diagram, the virtualized MEU circuit includes four inputs 756, 754, 756, and 758 to receive input signals $\lambda$, $\xi_{in}$, $\eta_{in}$, $q_{in}$ and four outputs 772, 774, 776, and 778 to provide output signals $\tilde{v}_{out}^2$, $\xi_{out}$, $\eta_{out}$, and $q_{out}$. The functions provided by the various circuit components are abstracted and can be viewed together as the virtualized circuitry. As earlier described, the individual SEU circuits can be configured for sequential and/or parallel processing to provide processing of input data streams having different QAM orders, block lengths, and/or priorities.

Figure 17:
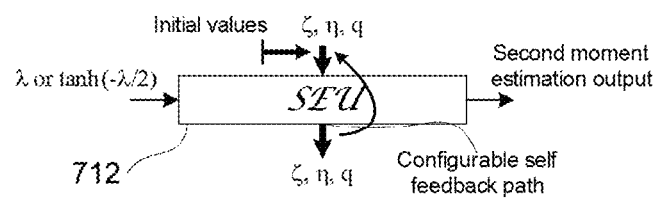
FIG. 17 is a block diagram of a virtualized second moment estimation unit circuit in one embodiment including a configurable self feedback path.

FIG. 17 is a block diagram depicting a further abstracted view of one embodiment of a virtualized SEU circuit. The set of inputs $\xi_{in}$, $\eta_{in}$, $q_{in}$ for receiving input Xi, Eta, and counter values are shown collectively as an input and the set of outputs $\xi_{out}$, $\eta_{out}$, and $q_{out}$ for providing corresponding output values are shown collecting as a single input. The outputs provide a configurable self feedback path. In another embodiment, the SEU circuit 712 in FIG. 16 may include an input $C_{in}$ and an output $C_{out}$. Control circuit 554 may configure an SC unit circuit by connecting its outputs to its inputs to provide sequential processing in one embodiment. Control circuit 554 may alternatively provide the set of outputs from one SEU circuit to a subsequent SEU circuit in the pool to provide parallel processing in one embodiment. The SEU circuit includes an input to receive a stream of $\lambda$ or tanh($-\lambda/2$) values. The SEU circuit includes an output $\tilde{v}_{out}^2$ to provide a signal including a representation of a second moment estimation $\tilde{v}_{out}^2$.

Figure 18:
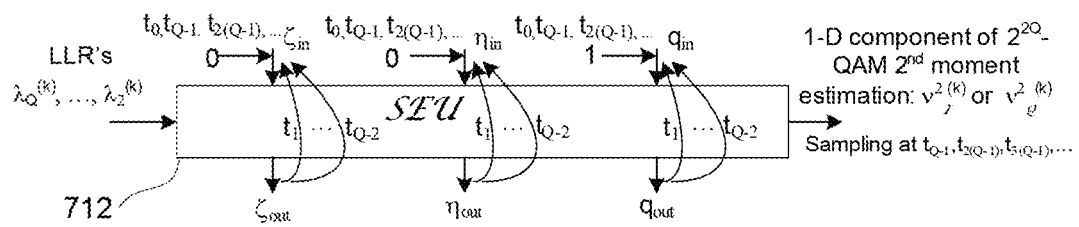
FIG. 18 is a block diagram of a virtualized second moment estimation unit circuit in one embodiment depicting sequential processing.

FIG. 18 is a block diagram of one embodiment of a virtualized SEU circuit 712, describing an example of sequential processing to compute one dimension of a QAM second moment estimation. FIG. 16 depicts the inputs $\xi_{in}$, $\eta_{in}$, and $q_{in}$ which receive corresponding Xi, Eta, and counter values for each unit processing time t0, t1, t2, etc. The three outputs $\xi_{out}$, $\eta_{out}$, $q_{out}$ generate output signals including corresponding representations of the Xi, Eta, and counter values for each unit processing time beginning at t1, t2, t3 . . . . In this example, the inputs $\xi_{in}$, $\eta_{in}$, and, $q_{in}$ are initialized to the values 0, 0, and 1, respectively. The LLR values for one data stream are sequentially sent as the $\lambda$ input, given as $\lambda_1^{(k)}, \ldots, \lambda_Q^{(k)}$ for a $2^{2Q}$-QAM.

For the three outputs $\xi_{out}$, $\eta_{out}$, $q_{out}$ the SEU circuit generates output signals including corresponding representations of the Xi, Eta, and counter values for each unit processing time beginning at $t_1, t_2, t_3 \ldots$. For sequential processing, the three outputs $\xi_{out}, \eta_{out}, q_{out}$ are configured to be provided to the three inputs $\xi_{in}, \eta_{in}$, and $q_{in}$ after running the SEU circuit for each unit processing time $t_1, t_2, \ldots t_{Q-2}$.

The SEU circuit generates for the output $\tilde{v}_{out}^2$ an output signal including a representation of the second moment estimation. After processing the circuit every Q−1 times, the estimation output $\tilde{v}_{out}^2$ is sampled as the resulting 1-D second moment estimation. The values $\xi_{in}, \eta_{in}$, and $q_{in}$ are reset with the initial values after the SEU circuit iterates Q−1 times, at times $t_0, t_{Q-1}, t_{2(Q-1)}, \ldots$. The second moment estimation values are obtained by sampling the estimation output $\tilde{v}_{out}^2$ at times $t_0, t_{Q-1}, t_{2(Q-1)}, \ldots$.

Figure 19:
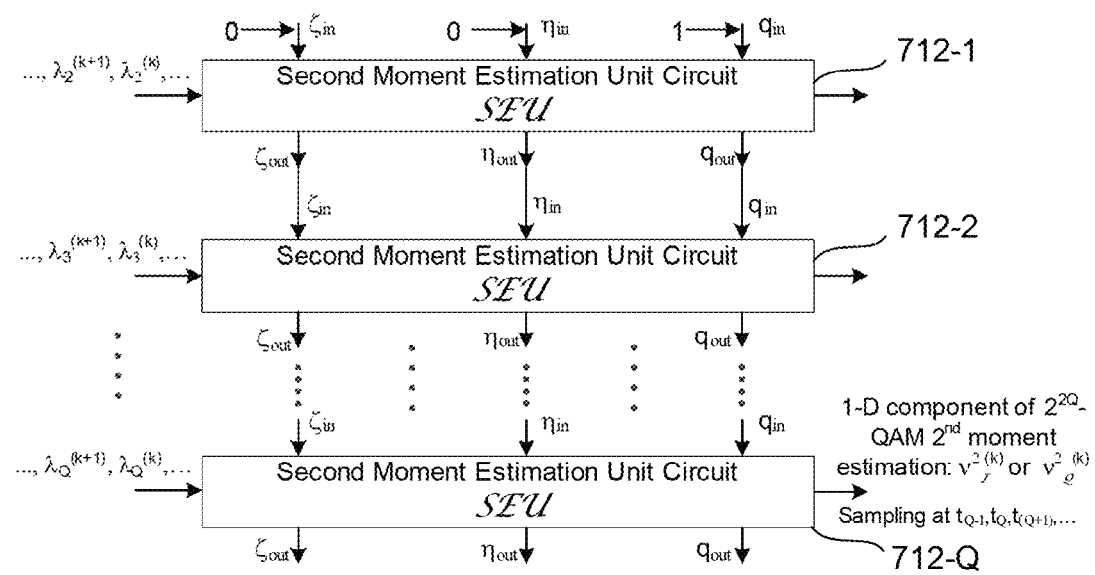
FIG. 19 is a block diagram of multiple virtualized second moment estimation unit circuits in one embodiment depicting parallel processing.

FIG. 19 is a block diagram of one embodiment of multiple virtualized SEU circuits 712-1, 712-2 . . . 712-Q describing an example of parallel processing to compute one dimension of a $2^{2Q}$-QAM second moment estimation. For a 1-D second moment estimation for a $2^{2Q}$-QAM signal, a number of circuits equal to Q can be parallel connected, with the outputs $\xi_{out}, \eta_{out}, q_{out}$ of a subset of the circuits connected to the inputs $\xi_{in}, \eta_{in}$, and $q_{in}$ of the subsequent SEU circuit in the chain. For the last circuit 712-Q of the chain, the outputs can be sampled at the times $t_{Q-1}, t_Q, t_{Q+1}, t_{Q+2} \ldots$.

For the first circuit 712-1, the inputs $\xi_{in}, \eta_{in}$, and $q_{in}$ are set to the initial values 0, 0, and 1, respectively. The LLR inputs $\lambda_1, \lambda_2, \ldots, \lambda_Q$ are routed to corresponding ones of the parallel-connected circuits. Because one SEU circuit takes the output of the previous SEU circuit in the chain, there is an initial delay while the SEU circuits await the previous SEU circuits to process. After Q−1 unit processing times, the second moment estimate can be obtained by sampling the estimation output $\tilde{v}_{out}^2$ at time $t_{Q-1}$. However, because each SEU circuit can take the output of the previous SEU circuit immediately, an estimate can be generated at the Q−1-th SEU circuits at unit processing times $t_{Q-1}, t_Q, t_{Q+1}$. Therefore, parallel processing may be faster than sequential processing with one unit circuit. However, if sequential processing is performed with Q−1 unit circuits, for example, the processing throughput will be the same.

Similarly as processing with MEU circuits, a pool of SEU circuits can be configured for hybrid sequential processing and parallel processing for processing one data stream.

Figure 20:
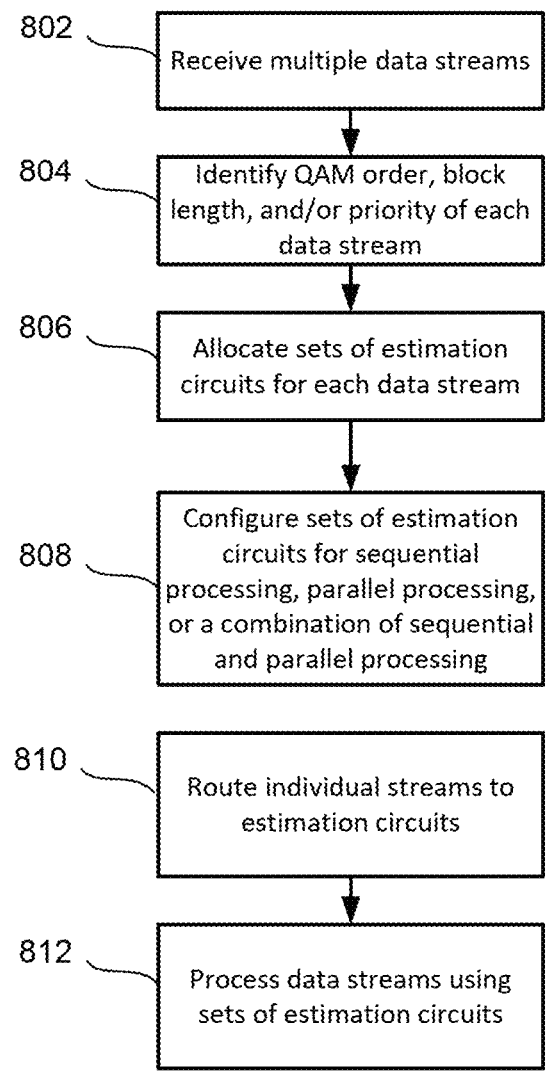
FIG. 20 is a flowchart describing processing of data streams using a pool of virtualized estimation unit circuits.

FIG. 20 is a flowchart describing processing of multiple data streams using a pool of reconfigurable estimation unit circuits. At step 802, multiple data streams are received. The data streams may be received at a base station or user terminal such as a mobile device in one embodiment. A control unit access each data stream and/or information associated with the data stream.

The control unit identifies the QAM order, block length, and/or a priority for each data stream at step 804. The QAM order may be determined from the data stream or information transmitted with the data stream. For example, the control unit may determine whether the data stream is a 4-QAM, 16-QAM, 64-QAM signal for example, although any order of QAM format may be used. The block length may be determined from the data stream or information transmitted with the data. Different data streams may include priority identifiers identifying data streams that may take priority over other data streams.

At step 806, the control unit allocates a set of estimation unit EU circuits for each data stream. The set of EU circuits may include a set of MEU circuits or SEU circuits. The set of circuits for each data stream may be based on the characteristics of the corresponding data stream. For example, the control unit may allocate a larger number of circuits to a set for a data stream having a higher QAM order. The control unit may allocate a larger number of circuits to a set for a data stream having a larger block length. The control unit may allocate a larger number of circuits to a set for a data stream having a higher priority. Combinations of these characteristics may also be considered. For example, the control unit may allocate a larger number of circuits to a set for a data stream having a lower QAM order, but a larger block length than another data stream.

At step 808, the control unit configures the sets of EU circuits for sequential processing, parallel processing, or a combination of sequential and parallel processing. For example the control unit may route the outputs of individual EU circuits in a set to their inputs for sequential processing. The control unit may route the outputs of a subset of EU circuits in a set to the inputs of a subsequent EU circuit in the set for parallel processing. At step 810, the control unit routes the individual data streams to the individual EU circuits for the corresponding set.

At step 812, the control unit processes the data streams using the sets of EU circuits. The control unit may sample the outputs of one or more circuits in the set at an appropriate interval established at step 808.

Figure 21:
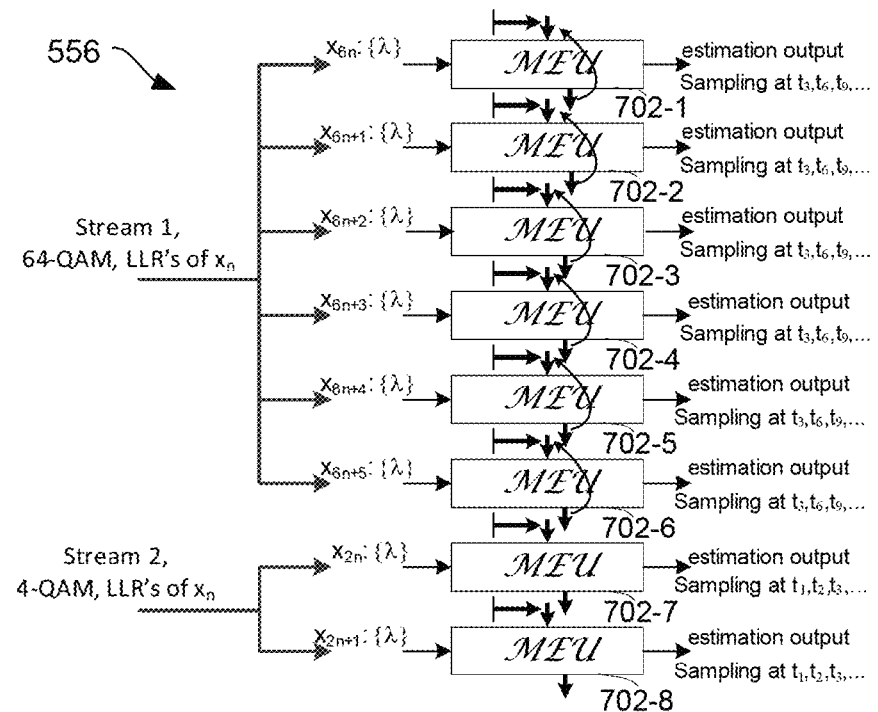
FIG. 21 is a block diagram of a pool of virtualized mean estimation unit circuits describing sequential processing of multiple data streams.
Figure 22:
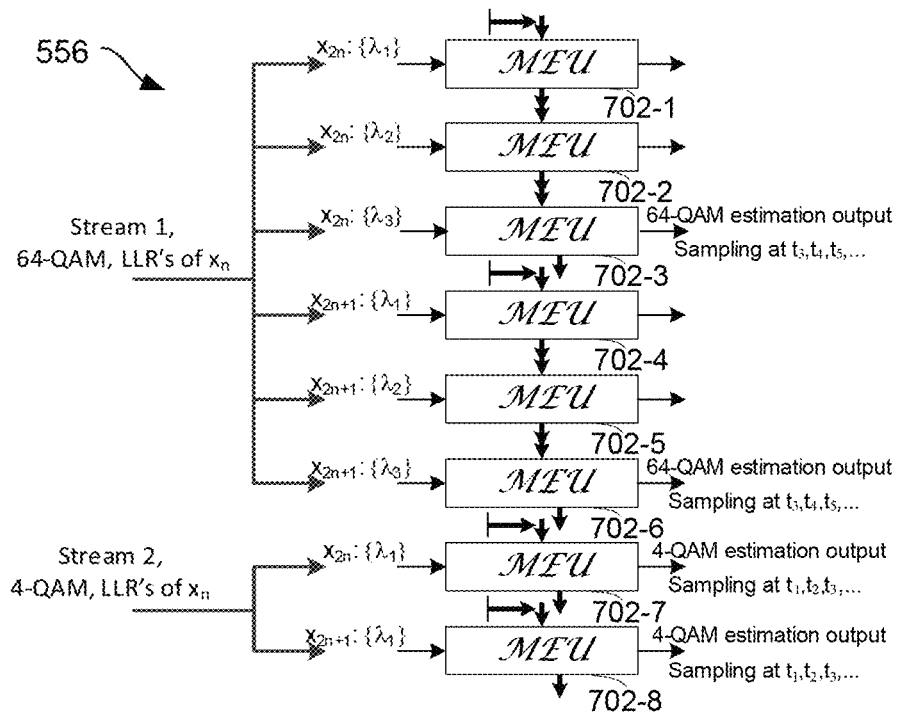
FIG. 22 is a block diagram of a pool of virtualized mean estimation unit circuits describing parallel processing of multiple data streams.

FIGS. 21 and 22 depict examples of processing multiple streams using sequential and parallel processing. FIGS. 21 and 22 are examples of processing that may be performed using the process of FIG. 20. FIG. 21 is a block diagram depicting a pool of virtualized MEU circuits 702-1, . . . 702-8, describing an example of processing two data streams as earlier presented. Although a specific example is shown with respect to a mean estimation using MEU circuits, it will be appreciated that the concepts apply equally to a second moment estimation using SEU circuits as earlier described. The first data stream is a 64-QAM data stream of LLR's xn. The second data stream is a 4-QAM data stream of LLR's xn. These data streams and QAM formats (orders) are presented for explanatory purposes only, the described principles extending equally to other QAM formats and data streams.

In this example, it is assumed that the pool includes eight MEU circuits, however a pool can include fewer or more than eight MC circuits. It is noted that only the pool of MEU circuits is shown, however a control unit as earlier described is provided to configure the circuits for appropriate processing as described.

The control unit configures the pool of MEU circuits for sequential processing in the example of FIG. 21. The control unit allocates a first set of six MEU circuits 702-1, 702-2, . . . 702-6 to process the data stream with 64-QAM and a second set of two MEU circuits 702-7, 702-8 to process the data stream with 4-QAM or QPSK. The control unit may allocate the eight MEU circuits in this manner to achieve the same or similar processing delay and to maximize the processing output rates.

In order to process the first data stream with 64-QAM, the control unit divides the first data stream into six parts ($x_{6n}, x_{6n+1}; x_{6n+2}; x_{6n+3}; x_{6n+4}; x_{6n+5}$) based on the QAM symbol partition. The LLRs for the 64-QAM symbols $x_{6n}$ are assigned to one unit circuit 702-1, the LLRs for the 64-QAM symbols $x_{6n+1}$ are assigned to another unit circuit 702-2, the LLRs for the 64-QAM symbols $x_{6n+2}$ are assigned to unit circuit 702-3, the LLRs for the 64-QAM symbols $x_{6n+3}$ are assigned to unit circuit 702-4, the LLRs for the 64-QAM symbols $x_{6n+4}$ are assigned to unit circuit 702-5, the LLRs for the 64-QAM symbols $x_{6n+5}$ are assigned to unit circuit 702-6.

For 64-QAM, each MEU circuit of the first set processes three times with the LLR inputs of $\lambda_i$, where i=1, . . . , 3 of an I or Q component to generate a one-dimension mean estimate of the QAM. Thus the control unit configures the sampling of outputs at $t_3$, $t_6$, ..., at each circuit. The control unit sets the configurable feedback path for the first MEU circuit 702-1 for the six circuit set to receive the initial values of $\xi$, $\eta$, and q. The control unit sets the configurable feedback path of each other MEU circuit of the first set to receive its own output values $\xi$, $\eta$, and q.

In order to process the second data stream with 4-QAM, the control unit divides the second data stream into two parts ($x_{2n}$; and $x_{2n+1}$) based on the QAM symbol partition. The LLRs for the 4-QAM symbols $x_{2n}$ are assigned to one circuit 702-7, and the LLRs for the 4-QAM symbols $x_{2n+1}$ are assigned to another circuit 702-8.

For 4-QAM, each MEU circuit of the second set processes one time with the LLR inputs of $\lambda_i$, where i=1 of an I or Q component to generate a one-dimension mean estimate of the QAM symbol. Thus the control unit configures the sampling of outputs at $t_3$, $t_6$, ..., at each circuit. The control unit sets the configurable feedback path for the first MEU circuit for the first set and the second set to receive the initial values of $\xi$, $\eta$, and q.

Overall, the processing throughput in this example includes six 1-D 64-QAM estimates and six 1-D 4-QAM estimates in three processing time units. Accordingly, the average is two 1-D 64-QAM estimates and two 1-D 4-QAM estimates in every unit processing time. For the previous approach shown in FIG. 10, the processing throughput is 1 1-D 64-QAM estimate and 1 1-D 4-QAM estimate in every unit processing time. Therefore, the sequential method with the pool of the virtualized MEU circuits doubles the processing throughput. For sequential processing, data is processed in one circuit and the information exchange between circuits is not needed. The output sampling rate is adapted to the different QAM formats.

FIG. 22 is a block diagram depicting a pool of virtualized MEU circuits, describing an example of parallel processing of the two data streams earlier presented. The control unit configures the pool of MEU circuits for parallel processing in the example of FIG. 22. The control unit allocates a first set of six MEU circuits to process the data stream with 64-QAM and a second set of two MEU circuits to process the data stream with 4-QAM or QPSK. The control unit may allocate the eight MEU circuits in this manner to achieve the same or similar processing delay and to maximize the processing output rates.

In order to process the first data stream with 64-QAM, the control unit configures the first set of MEU circuits into two subsets of three MEU circuits each. The first subset includes circuits 702-1, 702-2, 702-3 and the second subset includes circuits 702-4, 702-5, 702-6. Each chain of three MEU circuits can process one estimate of one dimension of a 64-QAM symbol by taking the outputs of one circuit to the inputs of another circuit. The LLRs $\lambda_i$ of the bit $b_i$ are sent to the same circuit in FIG. 22. The estimates are collected at the third circuit (702-3 and 702-6) of both subsets, with the input of $\lambda_3$ of the bit $b_3$ in each unit processing time starting at time $t_3$.

For the 4-QAM data stream, the process and estimation output collection are the same as that in the sequential processing approach, as the control unit only needs one circuit and one unit processing time in the circuit to generate one estimate output. Thus, with parallel processing, two 1-D 64-QAM estimates and two 1-D 4-QAM estimates are generated at each unit processing time, which is the same as that with the sequential processing approach. With parallel processing, the output sampling rate may be simplified. Interconnections between the circuits are provided, and the output sampling is switched to the appropriate circuit based on the QAM format.

Figure 23:
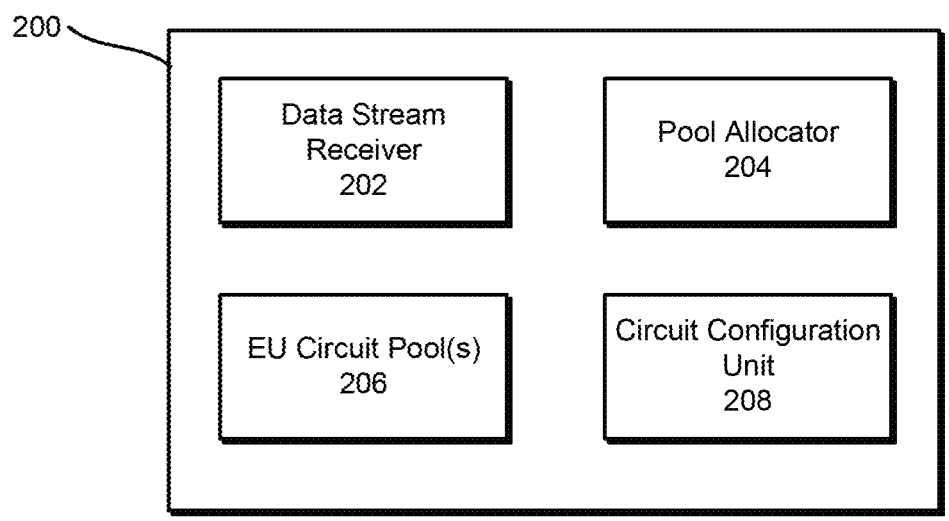
FIG. 23 is a block diagram depicting a system for processing QAM symbols in one embodiment.

The above examples use a 1-D estimation for a QAM symbol as examples since processing I and Q components of a square QAM is the same. It is also straightforward to extend the processes to the second moment estimation with a pool of virtualized MEU circuits V FIG. 23 is a block diagram depicting an apparatus (e.g., a receiver) 200 or other computing device in accordance with one embodiment. The receiver 200 includes a data stream receiver 202, one or more estimation unit EU circuit pools 206, and a circuit configuration unit 208. Data stream receiver 202 is one example of a data stream receiving means as described. Data stream receiver 202 is configured to receive data streams, including multiple data streams of varying QAM orders, block lengths, and/or priorities. Data stream receiver 202 may include or be formed as part of a control circuit 554 in one embodiment. Data stream receiver 202 may include specialized circuitry configured to receive data streams in one example. Data stream receiver 202 may include hardware, software, or a combination of hardware and software.

EU circuit pools 206 is one example of a means for pooling or aggregating individual circuit means or circuits. EU circuit pool 206 may include a pool of MEU or SEU circuits, or both. The pool of MEU and/or SEU circuits may include hardware, software, or a combination of hardware and software.

Pool allocator 204 is one example of a pool allocation means as described. Pool allocator 204 is configured to allocate EU circuits within one or more pools 206. Pool allocator 204 may allocate circuits based on the data streams that are received, including their QAM orders, block lengths, and/or priorities. Pool allocator 204 may include or be formed as part of a control circuit 554 in one embodiment. Pool allocator 204 may include specialized circuitry configured to allocate circuits in one example. Pool allocator 204 may include hardware, software, or a combination of hardware and software.

Circuit configuring unit 208 is one example of a circuit configuring means as described. Circuit configuring unit 208 configures EU circuits within one or more pools 206. Circuit configuring unit 208 may configure circuits for sequential and/or parallel processing. Circuit configuring unit 208 may include or be formed as part of a control circuit 554 in one embodiment. Circuit configuring unit 208 may include specialized circuitry to configure EU circuits in one embodiment. Circuit configuring unit 208 may include hardware, software, or a combination of hardware and software.

Figure 24:
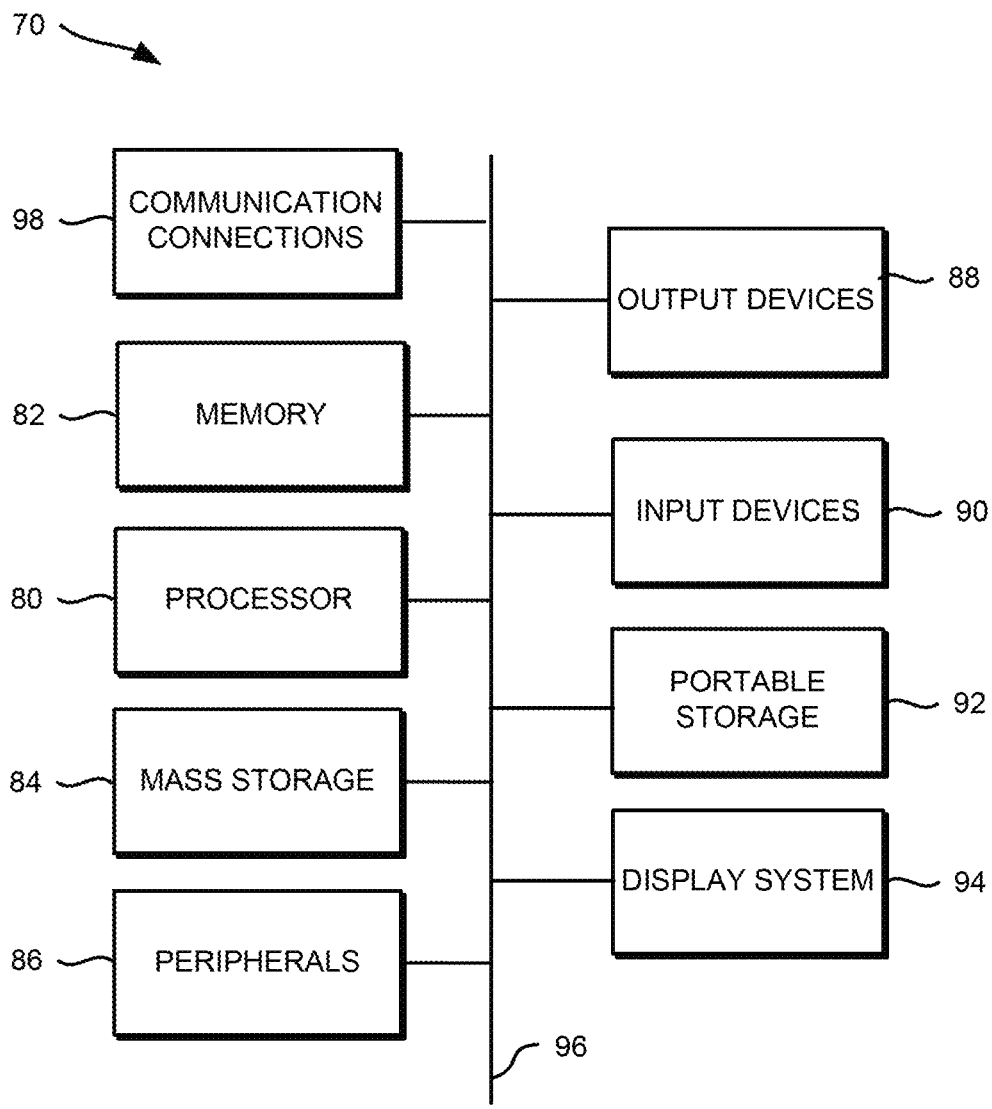
FIG. 24 is a block diagram of a computing system.

FIG. 24 is a high level block diagram of a computing system 70 which can be used to implement any of the computing devices described herein, such as user equipment and base stations. The computing system of FIG. 24 includes processor 80, memory 82, mass storage device 84, peripherals 86, output devices 88, input devices 90, portable storage 92, and display system 94. Computing devices as described herein may include fewer or additional components than those described. For example, a base station may not include peripherals 86, etc. For purposes of simplicity, the components shown in FIG. 24 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 10. In one embodiment, system software for implementing embodiments is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provide a portion of a user interface, and may include a keyboard or pointing device (e.g. mouse, track ball, etc.). In order to display textual and graphical information, the computing system will (optionally) have an output display system 94, which may include a video card and monitor. Output devices 88 can include speakers, printers, network interfaces, etc. System 100 may also contain communications connection(s) 98 that allow the device to communicate with other devices via a wired or wireless network. Examples of communications connections include network cards for LAN connections, wireless networking cards, modems, etc. The communication connection(s) can include hardware and/or software that enables communication using such protocols as DNS, TCP/IP, UDP/IP, and HTTP/HTTPS, among others.

The components depicted in the computing system of FIG. 24 are those typically found in computing systems suitable for use with the technology described herein, and are intended to represent a broad category of such computer components that are well known in the art. Many different bus configurations, network platforms, and operating systems can be used.

The technology described herein can be implemented using hardware, software, or a combination of both hardware and software. The software used is stored on one or more of the processor readable storage devices described above (e.g., memory 82, mass storage 84 or portable storage 92) to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media is non-transitory and may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware including custom integrated circuits, gate arrays, FPGAs, PLDs, and special purpose computers. In one embodiment, software (stored on a storage device) implementing one or more embodiments is used to program one or more processors. The one or more processors can be in communication with one or more computer readable media/storage devices, peripherals and/or communication interfaces. In alternative embodiments, some or all of the software can be replaced by dedicated hardware including custom integrated circuits, gate arrays, FPGAs, PLDs, and special purpose computers.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of the invention be defined by the claims appended hereto.

What is claimed is:

1. An apparatus, comprising:
a communication device configured to convert a plurality of input signals into baseband signals for digital processing;
a signal processor configured to generate from at least one baseband signal a stream of logarithmic likelihood ratio values, the signal processor including a plurality of estimation circuits configured to produce representations of mean or second moment estimations for quadrature amplitude modulation (QAM) based on the stream of logarithmic likelihood ratio values, each estimation circuit including a set of inputs and a set of outputs associated with Eta and Xi values used in the plurality of estimation circuits for the mean or second moment estimations; and
the signal processor including a control circuit coupled to the plurality of estimation circuits, the control circuit configured to alternately switch the plurality of estimation circuits between sequential and parallel processing of the mean estimations, the control circuit configured to provide the set of outputs of each estimation circuit to the set of inputs of said each estimation circuit for sequential processing, the control circuit configured to provide the set of outputs of a subset of the plurality of estimation circuits to another estimation circuit of the plurality of estimation circuits for parallel processing.

2. The apparatus of claim 1, wherein:
the control circuit is configured to allocate from the plurality of estimation circuits a first subset of estimation circuits including a first number of estimation circuits based on a first order of a QAM signal associated with a first data stream of logarithmic likelihood ratio values;
the control circuit is configured to allocate from the plurality of estimation circuits a second subset of estimation circuits including a second number of estimation circuits based on a second order of a QAM signal associated with a second data stream of logarithmic likelihood ratio values; and
the first order is higher than the second order and the first number is greater than the second number.

3. The apparatus of claim 1, wherein each estimation circuit to produce representations of mean estimations for QAM includes:
a first adder configured to iteratively generate an output Eta value based on an input Eta value and an input Xi value associated with a corresponding input signal; and
a first multiplier configured to iteratively generate a representation of a mean estimation for the corresponding input signal, the first multiplier configured to receive a variable QAM normalization factor based on a counter value associated with a number of iterations for a corresponding mean estimation, the first multiplier configured to receive the output Eta value and generate the mean estimation for each iteration based on combining the output Eta value and the variable QAM normalization factor.

4. The apparatus of claim 3, wherein:
the set of inputs of each estimation circuit includes a first input configured to receive an input Xi value, a second input configured to receive the input Eta value, and a third input configured to receive the counter value; and
the set of outputs of each estimation circuit includes a first output configured to provide an output Xi value, a second output configured to provide the output Eta value, and a third output configured to provide an updated counter value.

5. The apparatus of claim 1, wherein each estimation circuit to produce representations of second moment estimations for QAM includes:
a first circuit configured to iteratively generate an output by combining an output Eta value and an output quadrature amplitude modulated (QAM) dependent scalar value; and
a second circuit configured to iteratively generate a representation of a second moment estimation for a corresponding input signal, the second circuit configured to receive a variable QAM normalization factor based on a counter value associated with a number of iterations for a corresponding second moment estimation, the second circuit configured to receive the output of the first circuit and generate the second moment estimation for each iteration based on combining the variable QAM normalization factor and the output of the first circuit.

6. The apparatus of claim 5, wherein:
the set of inputs of each estimation circuit includes a first input configured to receive the counter value and a second input configured to receive an input QAM dependent scalar value; and
the set of outputs of each estimation circuit includes a first output configured to provide an output counter value and a second output configured to provide the output QAM dependent scalar value.

7. An apparatus, comprising:
an antenna configured to receive a plurality of input signals;
a transceiver configured to generate from a plurality of input signals a plurality of quadrature amplitude modulated (QAM) symbols;
a signal processor including a first circuit configured to generate an output Eta value based on an input Eta value and an output Xi value associated with the QAM symbols; and
the signal processor including a second circuit configured to generate a representation of a mean estimation for the QAM symbols, the second circuit configured to receive a variable QAM normalization factor based on a counter value associated with a number of iterations for a corresponding mean estimation, a first multiplier configured to receive the output Eta value and generate the mean estimation for each iteration based on combining the output Eta value and the variable QAM normalization factor.

8. The apparatus of claim 7, wherein:
the first circuit includes a first multiplier configured to receive the input Eta value and generate an increased Eta value;
the first circuit includes a first adder configured to combine the increased Eta value and the output Xi value;
the second circuit includes a second multiplier configured to combine the variable QAM normalization factor and the output Eta value; and
the signal processor includes a third multiplier configured to receive an input Xi value and generate the output Xi value by combining the input Xi value with an output generated from an input stream of logarithmic likelihood ratio (LLR) values.

9. The apparatus of claim 8, further comprising:
a memory coupled to the first multiplier, the memory stores a plurality of QAM normalization factors, each QAM normalization factor corresponding to a particular one of a plurality of counter values, the memory configured to receive the counter value and provide a particular QAM normalization factor to the first multiplier based on the counter value.

10. The apparatus of claim 9, further comprising:
a set of inputs including a first input configured to receive the input Xi value, a second input configured to receive the input Eta value, and a third input configured to receive the counter value; and
a set of outputs including a first output configured to provide the output Xi value, a second output configured to provide the output Eta value, and a third output configured to provide an updated counter value.

11. The apparatus of claim 10, wherein the set of inputs and the set of outputs are part of a first estimation circuit, the apparatus further comprising:
a second estimation circuit configured to produce a representation of a mean estimation for quadrature amplitude modulation (QAM);
wherein the set of inputs of the first estimation circuit is selectively connectable to the set of outputs of the first estimation circuit for sequential processing or a set of outputs of the second estimation circuit for parallel processing.

12. An apparatus, comprising:
an interface configured to receive a plurality of input signals;
a transceiver configured to generate from the plurality of input signals a plurality of quadrature amplitude modulated (QAM) symbols;
a first circuit configured to generate an output by combining an output Eta value and an output QAM dependent scalar value; and
a second circuit configured to generate a representation of a second moment estimation for the QAM symbols, the second circuit configured to receive a variable QAM normalization factor based on a counter value associated with a number of iterations for a corresponding second moment estimation, the second circuit configured to receive the output of the first circuit and generate the second moment estimation for each iteration based on combining the variable QAM normalization factor and the output of the first circuit.

13. The apparatus of claim 12, wherein
the first circuit includes a first multiplier configured to receive an input QAM dependent scalar value and generate an increased QAM dependent scalar value, the first circuit includes a first adder configured to receive the increased QAM dependent scalar value and generate the output QAM dependent scalar value, the first circuit includes a second adder configured to receive the output QAM dependent scalar value and the output Eta value;
the second circuit includes a second multiplier; and
the apparatus further comprises a third circuit including a third adder and a second multiplier, the third adder configured to receive an input Eta value and generate an increased Eta value, the second multiplier configured to receive the increased Eta value and generate the output Eta value.

14. The apparatus of claim 13, further comprising:
a memory coupled to the first multiplier, the memory stores a plurality of QAM normalization factors, each QAM normalization factor corresponding to a particular one of a plurality of counter values, the memory configured to receive the counter value and provide a particular QAM normalization factor to the first multiplier based on the counter value.

15. The apparatus of claim 14, further comprising:
a set of inputs including a first input configured to receive an input Xi value, a second input configured to receive the input Eta value, and a third input configured to receive an input counter value; and
a set of outputs including a first output configured to provide an output Xi value, a second output configured to provide the output Eta value, and a third output configured to provide an updated counter value.

16. The apparatus of claim 15, wherein the set of inputs and the set of outputs are part of a first estimation circuit, the apparatus further comprising:
a second estimation circuit configured to produce a representation of a second moment estimation for quadrature amplitude modulation (QAM);
wherein the set of inputs of the first estimation circuit is selectively connectable to the set of outputs of the first estimation circuit for sequential processing or a set of outputs of the second estimation circuit for parallel processing.

17. A method, comprising:
receiving one or more input signals;
converting the one or more input signals into a first quadrature amplitude modulated (QAM) signal and a second QAM signal;
generating a first data stream of logarithmic likelihood ratio values (LLR) associated with the first QAM signal and a second data stream of LLR values associated with the second QAM signal;
allocating from a pool of estimation circuits configured to produce representations of mean estimations or second moment estimations for QAM signals a first set of estimation circuits for the first QAM signal and a second set of estimation circuits for the second QAM signal, each estimation circuit including a set of inputs and a set of outputs associated with Eta and Xi values for the mean or second moment estimations;
configuring the first set of estimation circuits for sequential processing, parallel processing, or a combination of sequential and parallel processing by providing the set of outputs for each estimation circuit to the set of inputs for said each estimation circuit; and
configuring the second set of estimation circuits for sequential processing, parallel processing, or a combination of sequential and parallel processing by providing the set of outputs for a subset of estimation circuits of the second set to another estimation circuit of the second set.

18. The method of claim 17, wherein:
allocating the first set of estimation circuits includes allocating a first number of estimation circuits from the pool for the first set based on a first order of the first QAM signal; and
allocating the second set of estimation circuits includes allocating a second number of estimation circuits from the pool for the second set based on a second order of the second QAM signal, the second order is less than the first order and the second number is less than the first number.

19. The method of claim 17, wherein:
the first data stream includes a first block length and the second data stream includes a second block length that is less than the first block length;
allocating the first set of estimation circuits includes allocating a first number of estimation circuits from the pool based on the first block length; and
allocating the second set of estimation circuits includes allocating a second number of estimation circuits from the pool based on the second block length, the second number is less than the first number.

20. The method of claim 17, wherein:
the first data stream includes a first priority and the second data stream includes a second priority that is less than the first priority;
allocating the first set of estimation circuits includes allocating a first number of estimation circuits from the pool based on the first priority; and
allocating the second set of estimation circuits includes allocating a second number of estimation circuits from the pool based on the second priority, the second number is less than the first number.

21. The method of claim 17, wherein:
allocating the first subset of estimation circuits and the second subset of estimation circuits includes assigning a number of estimation circuits to the first subset and the second subset equal to 2Q, where Q defines a QAM order and $2^{2Q}$ is equal to a corresponding QAM order.

22. The method of claim 17, wherein:
the first QAM signal and the second QAM signal are received and processed during different time periods; and
the second set of estimation circuits includes at least one estimation circuit of the first set.

23. The method of claim 17, wherein:
configuring the first set of estimation circuits includes configuring the first set of estimation circuits for sequential processing by providing the set of outputs for each estimation circuit to the set of inputs for said each estimation circuit; and
configuring the second set of estimation circuits includes configuring the second set of estimation circuits for parallel processing by providing the set of outputs for a subset of estimation circuits of the second set to another estimation circuit of the second set.

* * * * *